(12) United States Patent
Toly

(10) Patent No.: US 8,162,668 B2
(45) Date of Patent: *Apr. 24, 2012

(54) MEDICAL TRAINING SIMULATOR INCLUDING CONTACT-LESS SENSORS

(75) Inventor: Christopher C. Toly, Seattle, WA (US)

(73) Assignee: Simulab Corporation, Seattle, WA (US)

( * ) Notice: Subject to any disclaimer, the term of this patent is extended or adjusted under 35 U.S.C. 154(b) by 42 days.

This patent is subject to a terminal disclaimer.

(21) Appl. No.: 12/265,207

(22) Filed: Nov. 5, 2008

(65) Prior Publication Data

US 2009/0061404 A1    Mar. 5, 2009

Related U.S. Application Data

(63) Continuation of application No. 11/101,776, filed on Apr. 7, 2005, now Pat. No. 7,665,995, which is a continuation-in-part of application No. 10/718,492, filed on Nov. 20, 2003, now Pat. No. 7,857,626, which is a continuation-in-part of application No. 09/695,380, filed on Oct. 23, 2000, now Pat. No. 6,780,016.

(51) Int. Cl.
G09B 23/28    (2006.01)

(52) U.S. Cl. ........................................ 434/267; 434/262

(58) Field of Classification Search .......... 434/262–275; 128/653
See application file for complete search history.

(56) References Cited

U.S. PATENT DOCUMENTS

| | | | |
|---|---|---|---|
| 2,689,415 A | 9/1954 | Haver | 434/272 |
| 2,871,579 A | 2/1959 | Niiranen et al. | 434/268 |
| 2,995,832 A | 8/1961 | Alderson | 434/268 |
| 3,426,449 A | 2/1969 | Van Noy, Jr. | 434/273 |
| 3,704,529 A | 12/1972 | Cioppa | 434/272 |
| 4,134,218 A | 1/1979 | Adams et al. | 35/17 |
| 4,273,682 A | 6/1981 | Kanamori | 252/511 |
| 4,360,345 A | 11/1982 | Hon | 434/262 |
| 4,439,162 A | 3/1984 | Blaine | 434/268 |
| 4,459,113 A | 7/1984 | Gatti et al. | 434/272 |

(Continued)

FOREIGN PATENT DOCUMENTS

CH        646538 A    11/1984

(Continued)

OTHER PUBLICATIONS

Catalog, Everest Medical Corporation, Minneapolis, MN, 1994.

(Continued)

*Primary Examiner* — Xuan Thai
*Assistant Examiner* — Timothy A Musselman
(74) *Attorney, Agent, or Firm* — Law Office of Ronald M. Anderson

(57) ABSTRACT

A medical training simulator includes contact-less sensors and corresponding detection objects, configured to enable sensor data collected during a training exercise to be used to evaluate the performance of the training exercise. The simulator includes a simulated anatomical structure, at least one contact-less sensor, and at least one detection object. During a training exercise, a spatial relationship between the contact-less sensor and the detection object produces data for evaluating performance of the training exercise. Either the contact-less sensor or the detection object is embedded in the simulated physiological structure, while the other is included in either a support for the simulated physiological structure, or as part of a tool used during the training exercise. Many types of contact-less sensors can be employed, including capacitance sensors, impedance sensors, inductive sensors, and magnetic sensors.

10 Claims, 13 Drawing Sheets

U.S. PATENT DOCUMENTS

| | | | |
|---|---|---|---|
| 4,481,001 A | 11/1984 | Graham | 434/267 |
| 4,596,528 A | 6/1986 | Lewis et al. | 434/270 |
| 4,605,373 A | 8/1986 | Rosen | 434/274 |
| 4,687,885 A | 8/1987 | Talmage, Jr. et al. | 178/18 |
| 4,767,333 A | 8/1988 | Born | 434/268 |
| 4,773,865 A | 9/1988 | Baldwin | 434/268 |
| 4,789,340 A | 12/1988 | Zikria | 434/272 |
| 4,872,841 A | 10/1989 | Hamilton et al. | 434/274 |
| 4,898,173 A | 2/1990 | Daglow et al. | 128/419 |
| 4,907,973 A | 3/1990 | Hon | 434/262 |
| 5,051,605 A | 9/1991 | D'Antonio et al. | 307/116 |
| 5,090,910 A | 2/1992 | Narlo | 434/82 |
| 5,104,328 A | 4/1992 | Lounsbury | 463/273 |
| 5,112,228 A | 5/1992 | Zouras | 434/272 |
| 5,137,458 A | 8/1992 | Ungs et al. | 434/262 |
| 5,149,270 A | 9/1992 | McKeown | 434/262 |
| 5,205,286 A | 4/1993 | Soukup et al. | 128/630 |
| 5,211,165 A * | 5/1993 | Dumoulin et al. | 600/410 |
| 5,215,469 A | 6/1993 | Kohnke et al. | 434/268 |
| 5,320,537 A | 6/1994 | Watson | 434/272 |
| 5,425,644 A | 6/1995 | Szinicz | 434/268 |
| 5,518,406 A | 5/1996 | Waters | 434/267 |
| 5,518,407 A | 5/1996 | Greenfield et al. | 434/272 |
| 5,589,639 A | 12/1996 | D'Antonio et al. | 73/724 |
| 5,589,838 A | 12/1996 | McEwan | 342/387 |
| 5,609,485 A | 3/1997 | Bergman et al. | 434/262 |
| 5,609,615 A | 3/1997 | Sanders et al. | 607/36 |
| 5,620,326 A | 4/1997 | Younker | 434/268 |
| 5,722,836 A | 3/1998 | Younker | 434/272 |
| 5,734,418 A | 3/1998 | Danna | 348/76 |
| 5,754,313 A | 5/1998 | Pelchy et al. | 358/473 |
| 5,775,916 A | 7/1998 | Cooper et al. | 434/267 |
| 5,800,178 A | 9/1998 | Gilio | 434/262 |
| 5,823,787 A | 10/1998 | Gonzalez et al. | 434/265 |
| 5,832,772 A | 11/1998 | McEwan | 73/290 |
| 5,853,292 A | 12/1998 | Eggert et al. | 434/262 |
| 5,855,553 A | 1/1999 | Tajima et al. | 600/407 |
| 5,883,591 A | 3/1999 | McEwan | 342/22 |
| 5,947,743 A | 9/1999 | Hasson | 434/264 |
| 5,951,301 A | 9/1999 | Younker | 434/272 |
| 5,967,790 A | 10/1999 | Strover et al. | 434/273 |
| 6,074,213 A | 6/2000 | Hon | 434/262 |
| 6,095,148 A | 8/2000 | Shastri et al. | 128/898 |
| 6,139,489 A | 10/2000 | Wampler et al. | 600/109 |
| 6,211,904 B1 | 4/2001 | Adair et al. | 348/76 |
| 6,234,804 B1 | 5/2001 | Young | 434/267 |
| 6,256,012 B1 | 7/2001 | Devolpi | 345/161 |
| 6,270,491 B1 | 8/2001 | Toth et al. | 606/11 |
| 6,361,323 B1 | 3/2002 | Beach et al. | 434/262 |
| 6,428,323 B1 | 8/2002 | Pugh | 434/274 |
| 6,436,035 B1 | 8/2002 | Toth et al. | 600/249 |
| 6,443,735 B1 | 9/2002 | Eggert et al. | 434/262 |
| 6,527,704 B1 | 3/2003 | Chang et al. | 600/112 |
| 6,532,379 B2 | 3/2003 | Stratbucker | 600/382 |
| 6,544,041 B1 | 4/2003 | Damadian | 434/262 |
| 6,575,757 B1 | 6/2003 | Leight et al. | 434/273 |
| 6,659,776 B1 | 12/2003 | Aumann et al. | 434/262 |
| 6,750,769 B1 * | 6/2004 | Smith | 340/572.1 |
| 6,773,263 B2 | 8/2004 | Nicholls et al. | 434/267 |
| 6,857,878 B1 | 2/2005 | Chosack et al. | 434/267 |
| 7,037,006 B2 | 5/2006 | Chapman | 396/428 |
| 2001/0000187 A1 | 4/2001 | Peckham et al. | 607/48 |
| 2001/0055748 A1 | 12/2001 | Bailey | 434/262 |
| 2002/0126501 A1 | 9/2002 | Toth et al. | 362/552 |
| 2002/0168618 A1 | 11/2002 | Anderson et al. | 434/262 |
| 2003/0068606 A1 | 4/2003 | Nicholls et al. | 434/262 |
| 2003/0073060 A1 | 4/2003 | Eggert et al. | 434/262 |
| 2004/0115607 A1 * | 6/2004 | Pastrick et al. | 434/262 |
| 2004/0142314 A1 | 7/2004 | Hasson et al. | 434/262 |
| 2004/0214150 A1 * | 10/2004 | Eggert et al. | 434/273 |
| 2007/0178429 A1 | 8/2007 | Bell | 434/263 |

FOREIGN PATENT DOCUMENTS

| | | |
|---|---|---|
| DE | 0 601 806 | 3/1993 |
| DE | 4212908 | 10/1993 |
| FR | 0 217 689 | 11/1986 |
| FR | 2 691 826 | 12/1993 |
| GB | 2 277 826 B | 11/1994 |
| WO | WO 93/14483 | 7/1993 |
| WO | WO 93/16664 | 9/1993 |
| WO | WO 93/21619 | 10/1993 |
| WO | WO 94/25948 | 10/1994 |
| WO | WO 98/58358 | 12/1998 |
| WO | WO 01/32249 | 5/2001 |

OTHER PUBLICATIONS

Catalog, Advanced Surgical, Inc., Princeton, N.J., early as Apr. 1996.

Limbs & Things Ltd. Brochure, Bristol, England, 18 pp. 1996.

"Product News," Limbs & Things Newsletter, 4pp. 1995.

"Human Patient Simulator," Medical Education Technologies, Inc., <http://www.meti.com/-home.html>.

Emergency Cricothyroidotomy, http://www.cpp.usmc.mil/schools/fmss/-Power%20Point/0410.PPT.

Patient Simulator Program, http://www.cscc.edu/docs/nurs/patientsim.htm.

"*The Good, The Bad, and The Ugly*" Target material. Kaman Measuring Systems, 2004, 3pages. <http://www.kamansensors.com/html/technology/technology-tntargetmaterial.htm>.

"*Variable Impedance Transducers*". Kaman Measuring Systems, 2004, 2 pages. <http://www.kamansensors.com/html/technology/technology-variable.htm>.

"*Differential Impedance Transducers*" Kaman Measuring Systems, 2004, 2 pages. <http://www.kamansensors.com/html/technology/technology-differential.html>.

"*A Low-Power Hall-Effect Switch*." Sensors Magazine, Jun. 1999. Christine Graham, 2 pages Allegro MicroSystems, Inc., USA <http://www.allegromicro.com/techpub2/3210/3210papr.htm>.

"*PNI SEN-S65 Magneto-Inductive Sensor*." Mar. 2004, PNI Corporation, 5464 Skylane blvd., Santa Rosa, CA 95403-1084 USA. 1page. <http://www.pnicorp.com>.

"*Giant Magnetic Resistive Potentiometers with Strong Potentialities*." (CORDIS focus, No. 45, Oct. 2003). 2pages. <http://www.sensorportal.com/HTML/Potentiometers_Projects.htm>.

"*Non-contact Thread Detection*." (Sensor Applications, Application Story, Mar. 2002). 2 pages. <http://sensorland.com/AppPage049.html>.

"*The Hall Effect*." How they Work, How Sensors Work—HART Protocol. Sep. 22, 2004. 2 pages. <http://www.sensorland.com/HowPage046.html>.

"*Technical Advances in Hall-Effect Sensing*". (Product Description) Allegro® MicroSystems, Inc. Gilbert, Joe, 6 pages.

* cited by examiner

MEDICAL TRAINING SIMULATOR INCLUDING CONTACT-LESS SENSORS

RELATED APPLICATIONS

This application is a continuation of copending patent application Ser. No. 11/101,776, filed on Apr. 7, 2005 which itself is a continuation-in-part of a copending patent application Ser. No. 10/718,492, filed on Nov. 20, 2003, which itself is a continuation-in-part of a prior patent application Ser. No. 09/695,380, filed on Oct. 23, 2000 (now issued as U.S. Pat. No. 6,780,016), the benefit of the filing dates of which is hereby claimed under 35 U.S.C. §120.

BACKGROUND

The use of simulated physiological structures for training medical students and for providing skill training to practicing physicians is widespread. Although cadavers have traditionally been beneficially employed for this purpose, cadavers are not always readily available and are not well suited for all types of training.

Simulated physiological structures should preferably be usable multiple times and should provide a realistic training experience corresponding to what the trainee would experience if performing a procedure on an actual patient. The need for such simulators is significant, because they can provide valuable training that will lead to more effective treatment of patients.

The use of a training model (such as a cadaver, an animal, or a simulator) is desirable to properly prepare a student or physician to perform procedures on a variety of patients. While anatomy follows general rules, variations based on sex, age, height, and weight are the norm. A surgical student should not just blindly follow directions such as "make an incision four inches long and two inches deep, starting at the navel." Normal variations, such as the amount of body fat on a specific patient, will significantly change the depth of fat tissue that must be incised to reach an internal organ. Surgeons must rely on their knowledge of general anatomy, and evident cues (e.g., visually noting whether the patient has a low or high percentage of body fat, or whether the patient is a child, an adult, a female, etc.) to determine the correct location and other variable parameters, before performing a procedure on a specific patient. The use of cadavers, animal models, and anatomically correct simulators enable surgical students and physicians to apply their knowledge of anatomy to develop experience in assessing these factors, so as to properly determine the proper parameters to be applied when executing a procedure on a live patient.

To provide the desired level of realism, a simulated physiological structure used for training medical personnel should both tactilely and visually resemble the anatomical structure being simulated. Even if a simulated physiological structure having simulated tissue faithfully portrays finer details of an actual physiological structure and provides a realistic tactile sensation during a simulated procedure, the few prior art simulators that may both tactilely and visually resemble the anatomical structure being simulated do not include means for producing objective and measurable results that can be used to evaluate how well a simulated procedure is performed. Clearly, it would be desirable to employ a simulated physiological structure that is able to provide a realistic tactile sensation during a simulated procedure, and which is also able to provide an objective indication that can be used to evaluate how well a simulated procedure was executed.

SUMMARY

This application specifically incorporates by reference the disclosures and drawings of each patent application and issued patent identified above as a related application.

In the present invention, contact-less sensors and corresponding detection objects are used to enhance the performance of medical training systems. By using contact-less sensors and corresponding detection objects, each contact-less sensor and detection object can be incorporated into components of the medical training system in a way that hides the sensors and detection objects from view. This approach not only enhances a realistic appearance of the components of the medical training system, it also reduces a likelihood that any trainee will be able to infer a particular significance for any portion of a component of the medical training system by recognizing that a sensor or a detection object is disposed in a particular portion of the medical training system. Many different types of contact-less sensors can be employed, such as magnetic sensors, capacitance-based sensors, and inductive-based sensors.

In one embodiment, a medical model is configured to be used in connection with a simulated or actual medical instrument. At least one sensor is incorporated into either the simulated instrument or the medical model. At least one detection object is incorporated into the other of the simulated instrument or the medical model. Each sensor is logically coupled to a processor, which is preferably implemented with a personal computing device. The processor can be incorporated into the medical model or can be a stand alone unit. The detection objects are matched to the type of sensor employed. For example, if the sensor is a reed switch or a Hall effect device, then the detection object will be a magnet.

Embodiments in which the detection object is incorporated into the medical model enable less-expensive medical models to be produced, because detection objects are generally less expensive than their corresponding sensor. A single sensor integrated into a simulated instrument can detect a plurality of different detection objects distributed throughout a medical model. Furthermore, if the sensors are included in the simulated medical instrument rather than incorporated into the medical model, the medical model should not require wiring (which would complicate the manufacturing process of the medical model) to logically couple each sensor to the processor.

The location at which sensors or detection objects are incorporated into simulated instruments and medical models is largely a function of a particular exercise that will be performed using a specific simulated instrument and a specific medical model. For example, if a particular training exercise requires that a student identify a plurality of discrete different features associated with the medical model, then a detection object (or sensor) can be disposed adjacent to each feature that must be identified, such that the detection object (or sensor) is hidden from view. During the training exercise, when the student properly positions the simulated instrument adjacent to a feature to be identified, a sensor (or detection object) incorporated into the simulated instrument (for example at a distal end of the simulated instrument) is triggered, indicating that the student has correctly identified a particular feature.

In another embodiment, at least one detection object is incorporated into a disposable simulated physiological structure, such as a simulated tissue. The detection object is incorporated into a portion of the simulated tissue that must be dissected in a training exercise. Before the exercise, the simulated tissue is placed adjacent to a sensor bed, such that the sensor is triggered by the detection object in the simulated tissue structure. When the student successfully dissects the portion of the simulated tissue structure incorporating the detection object, the sensor is no longer triggered by the detection object, and the processor can provide feedback indicating that the student has successfully completed the exercise. Such a sensor bed can be beneficially incorporated into a box trainer. Further, it should be understood that the sensor bed can be used with the simulated tissue, and without a box trainer, if so desired. Additional detection objects can be incorporated into the simulated tissue, with additional sensors being incorporated into the sensor bed to facilitate proper positioning of the simulated tissue relative to the sensor bed.

The sensor data collected during a training exercise can be used to immediately provide feedback to a student during the training exercise, or can be stored for later review, or the sensor data can be manipulated to provide feedback only to a proctor monitoring the training exercise, so that the proctor knows whether the student has successfully completed the training exercise. Sensor data (or feedback generated by the processor after receiving the sensor data) can be communicated to remote locations over a network, so that the proctor and student do not need to be in the second location. Thus, the present invention is well-suited for remote learning environments.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 schematically illustrates a medical model including a plurality of contact-less sensors that are incorporated into the medical model, each sensor being configured to detect a detection object disposed on a distal end of a simulated medical instrument;

Figure 3:
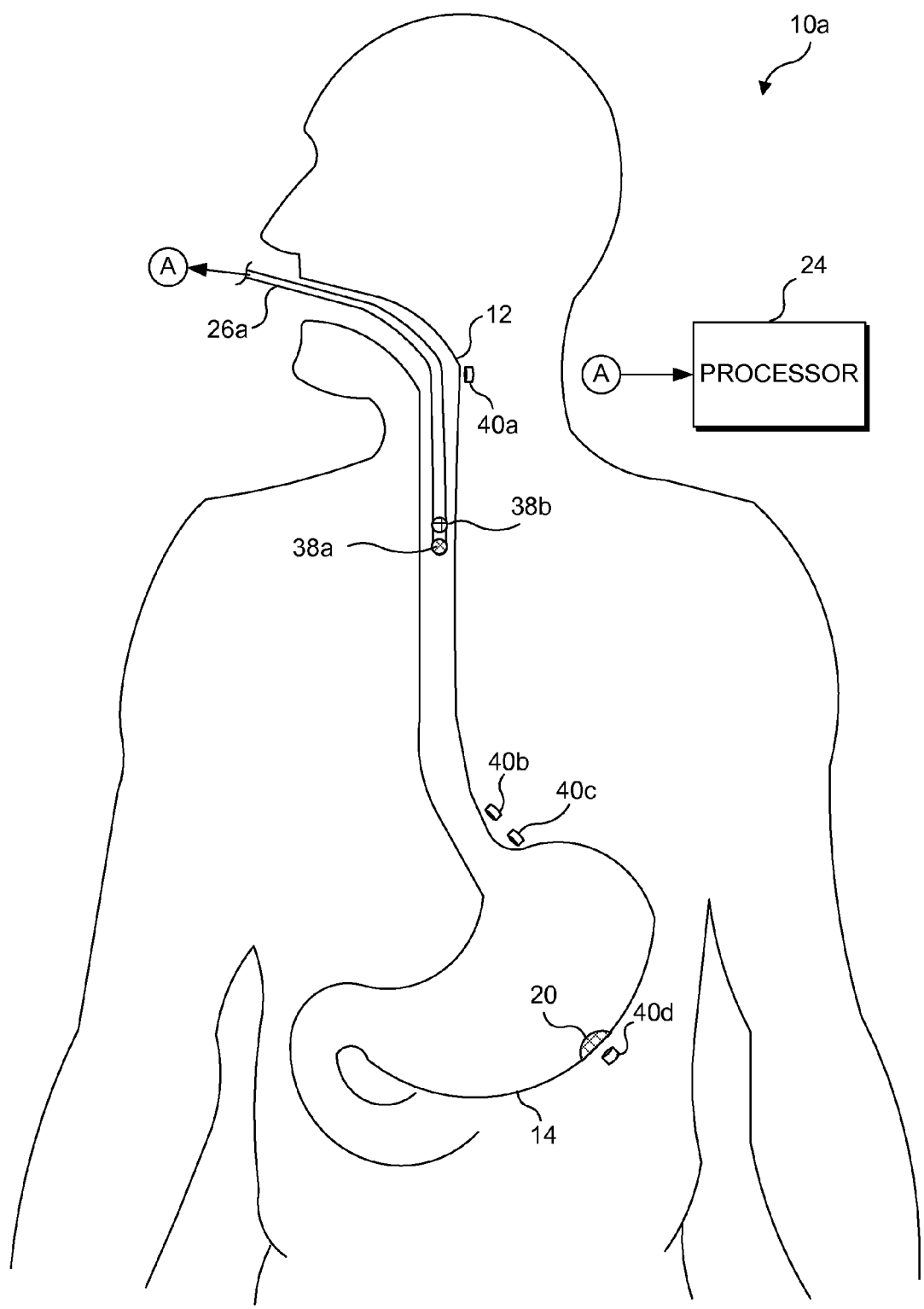
Figure 4:
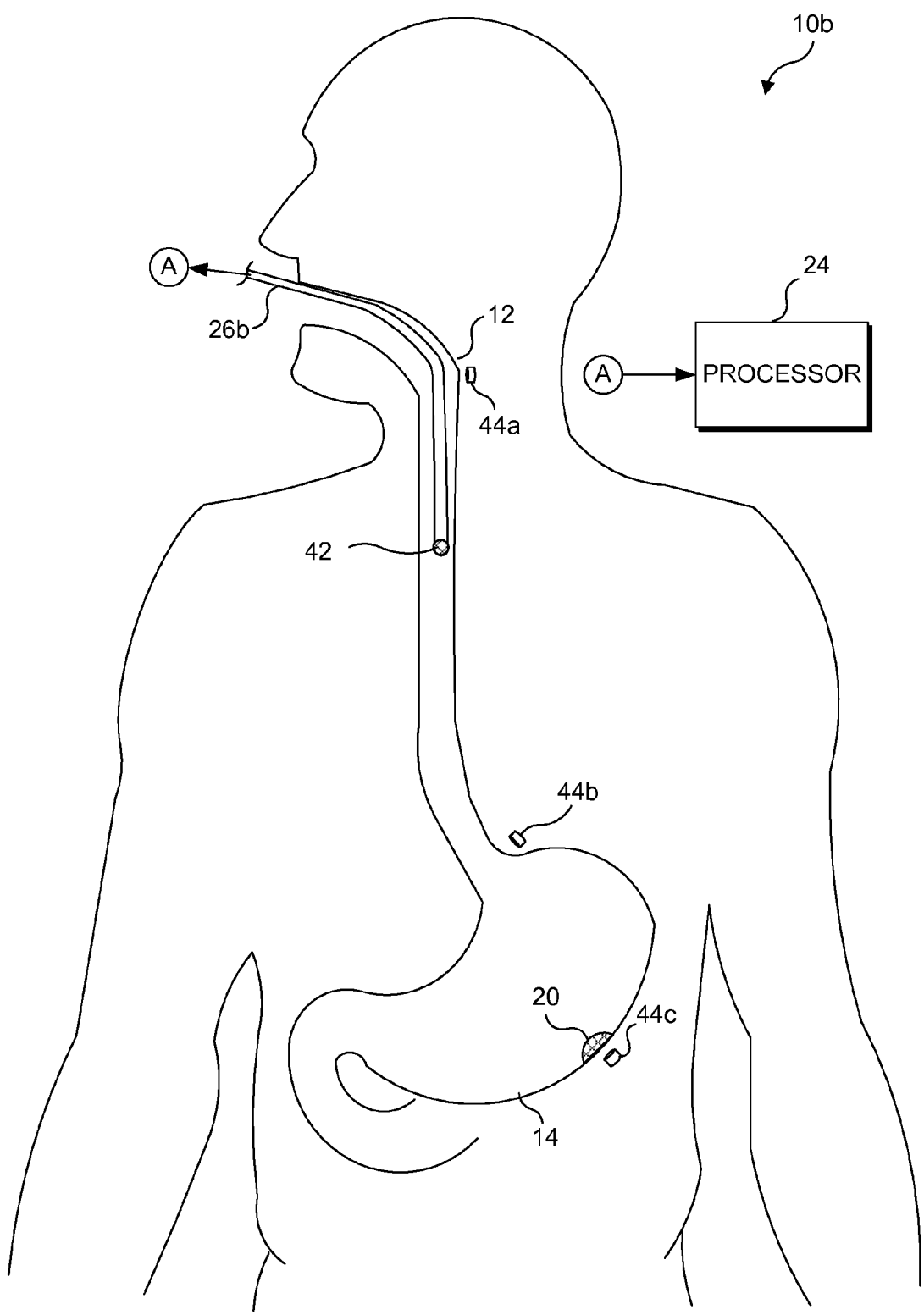
Figure 5:
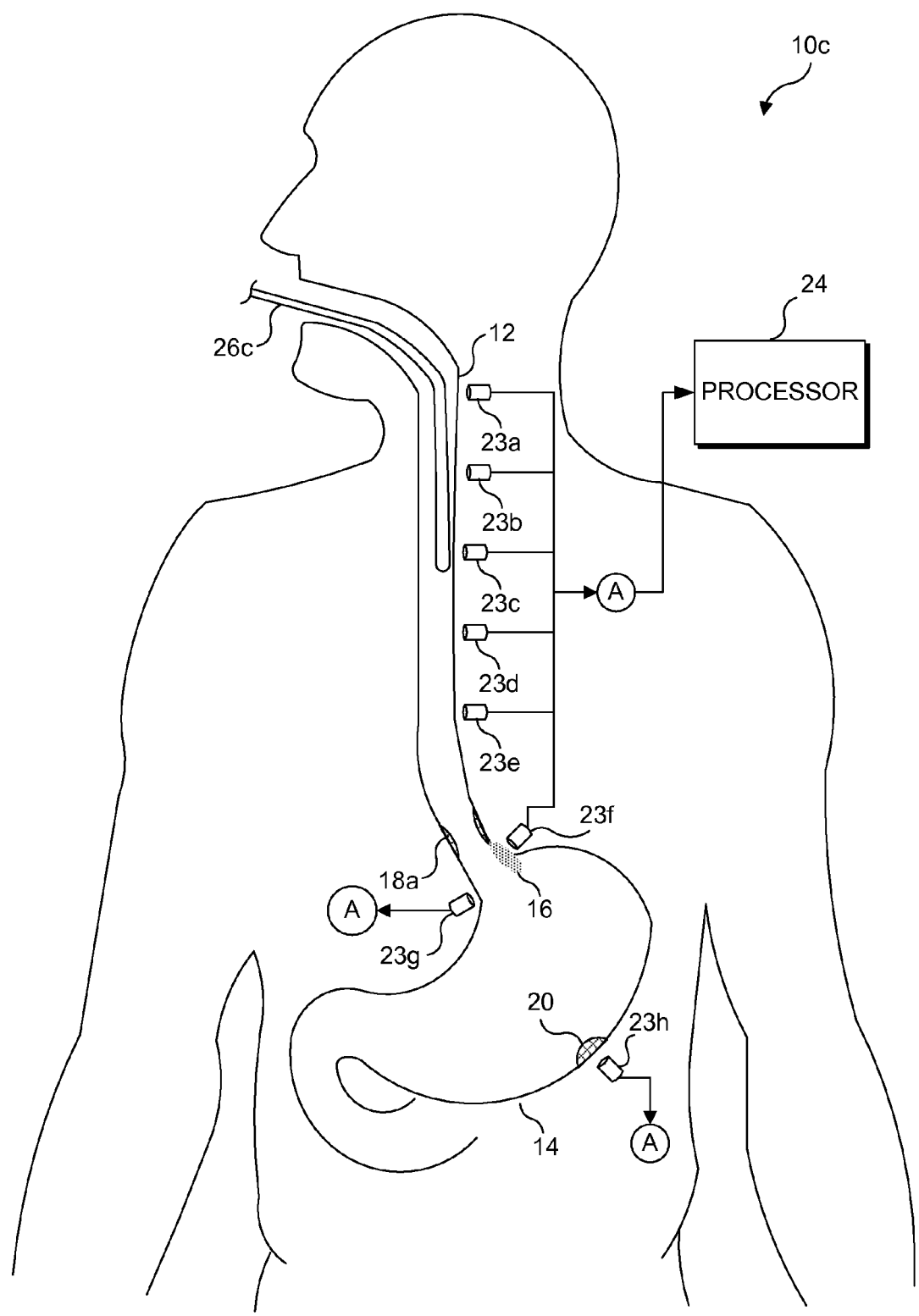
Figure 6:
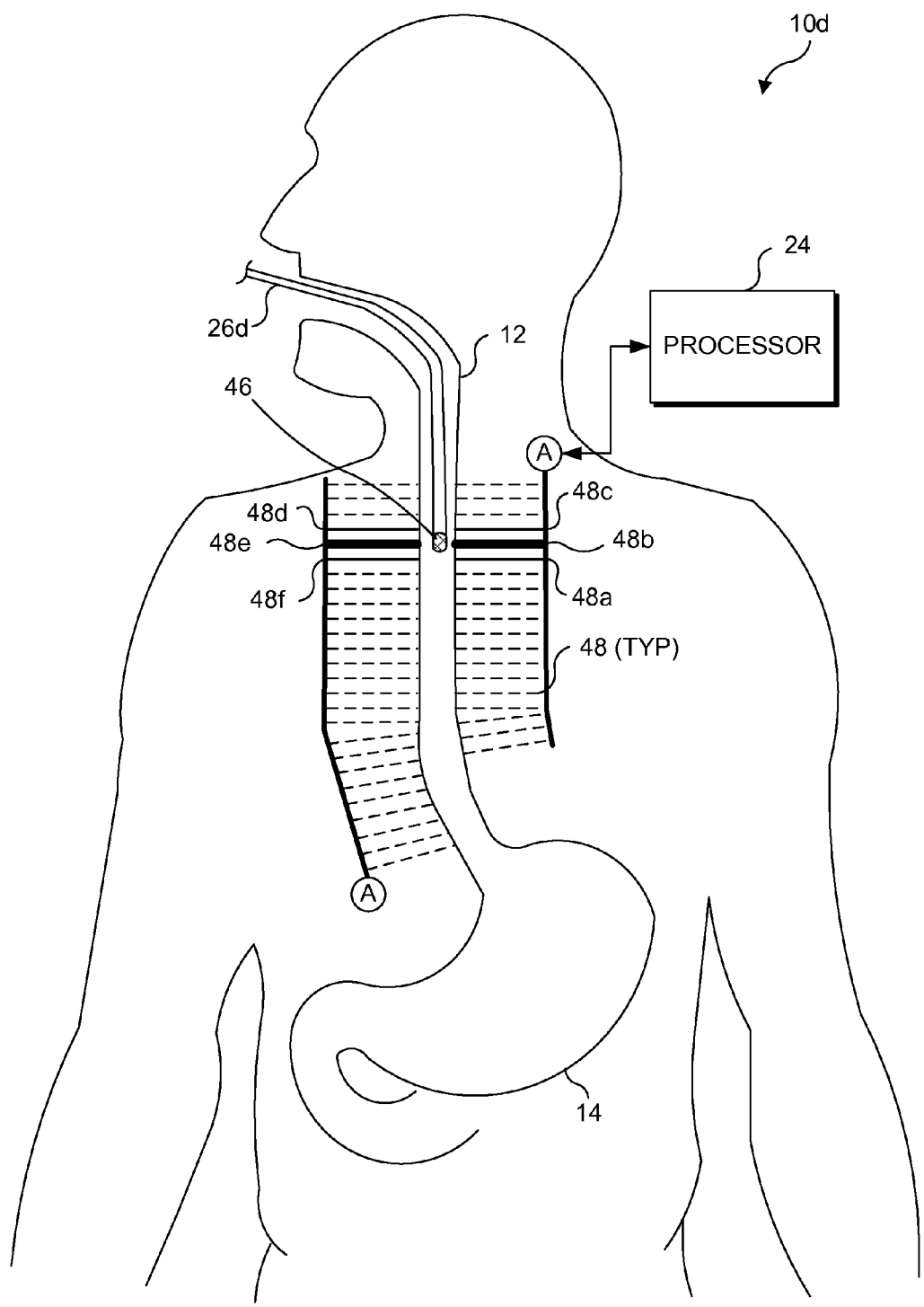
Figure 7:
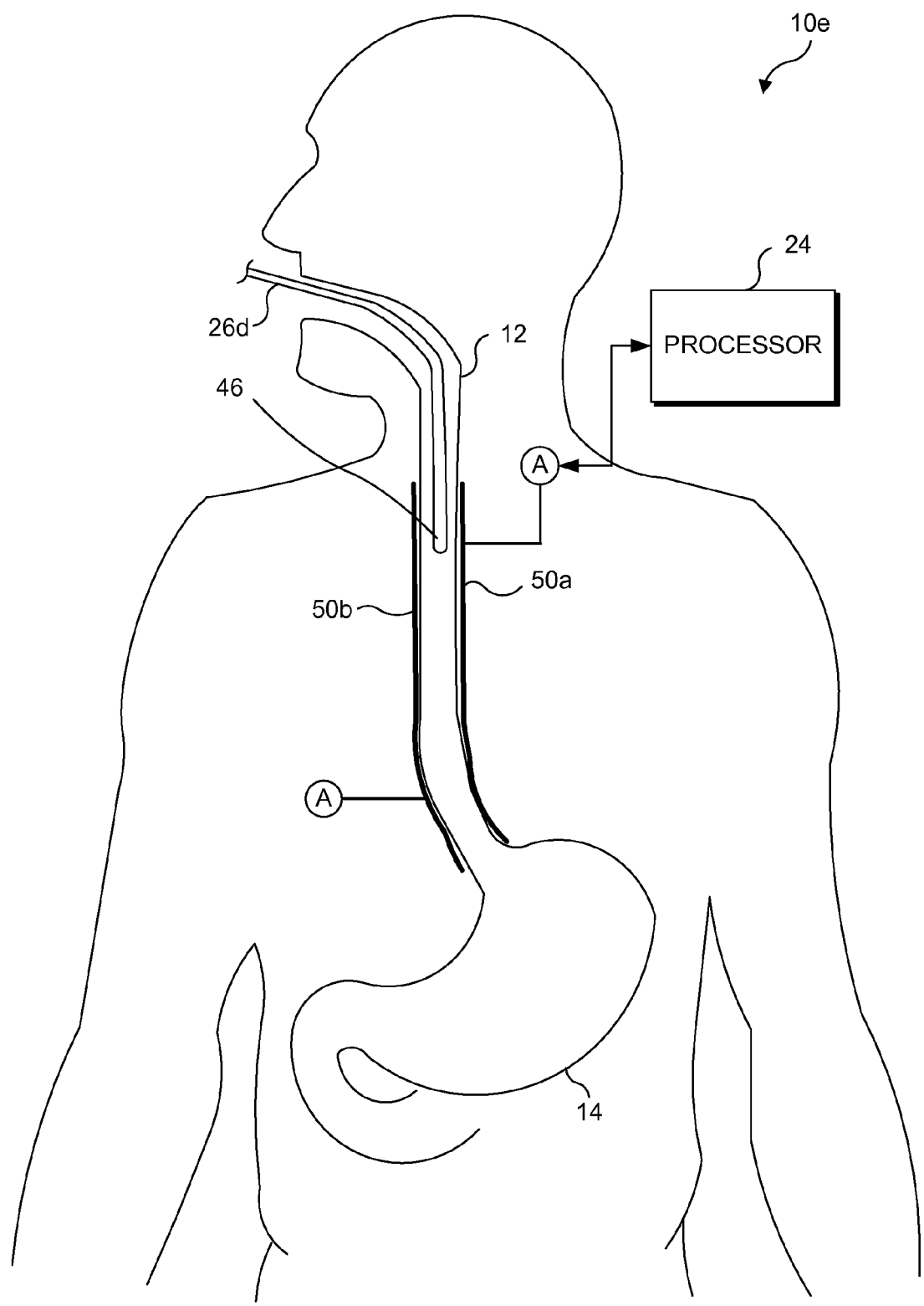
Figure 8B:
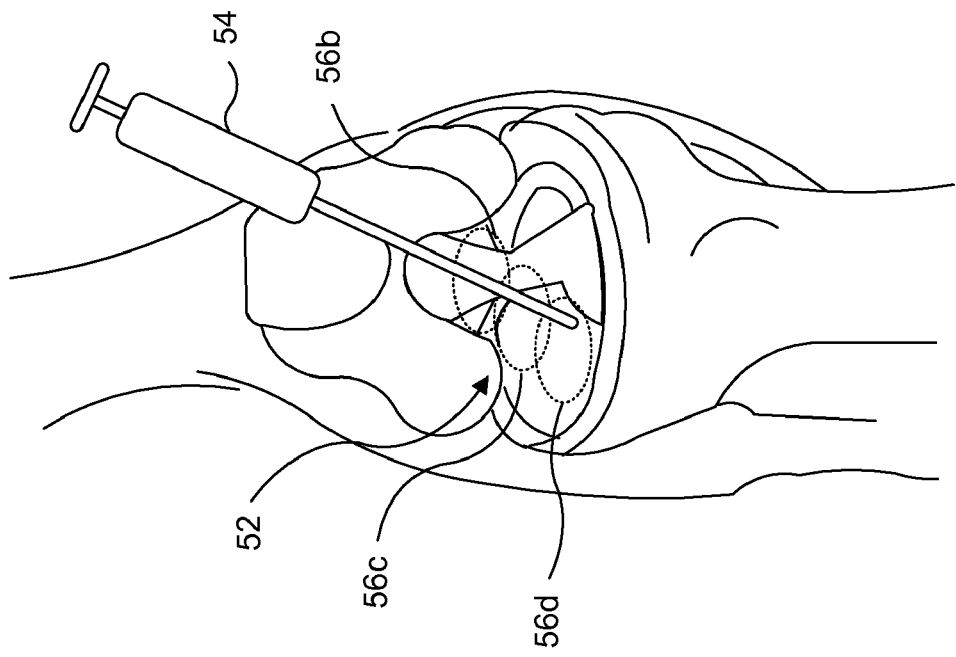
Figure 8A:
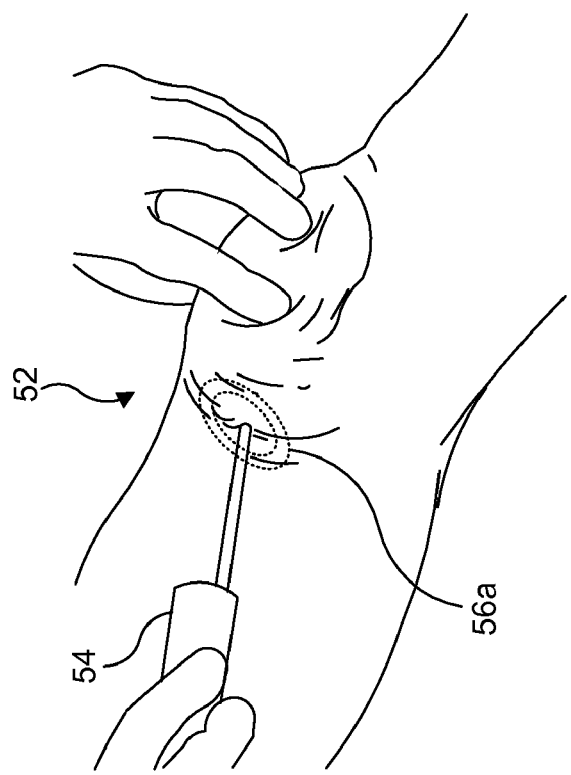
Figure 9A:
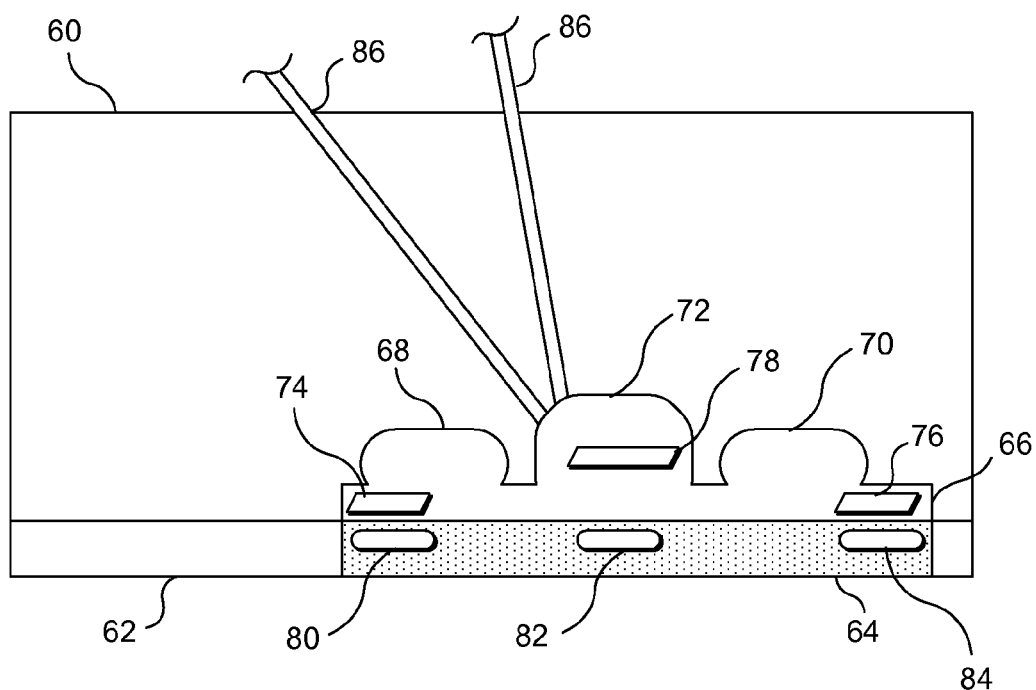
Figure 9B:
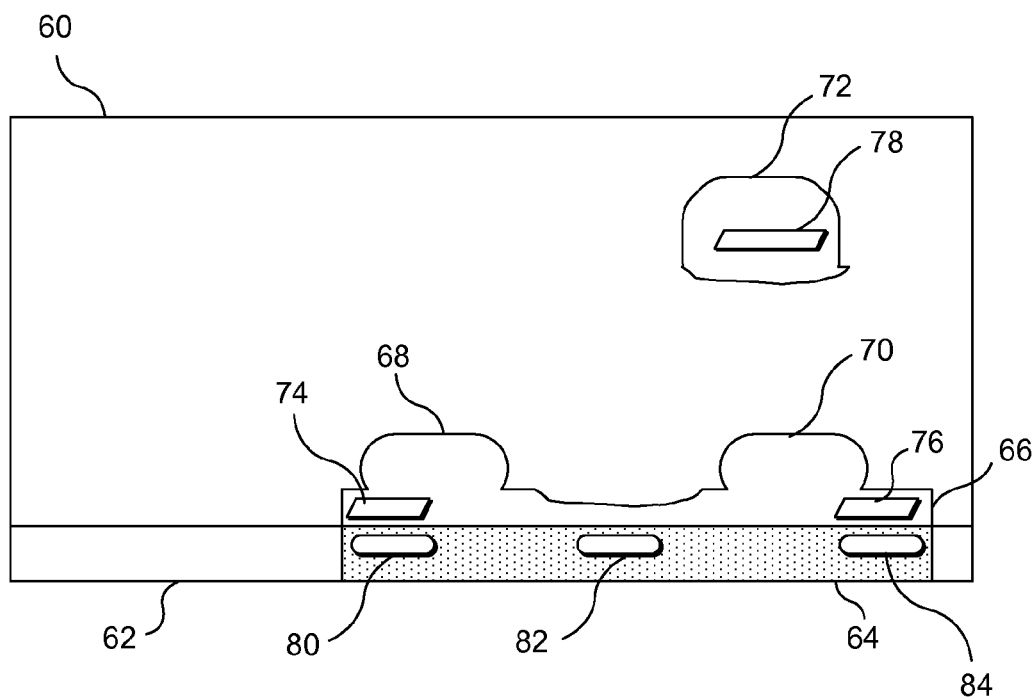
Figure 10:
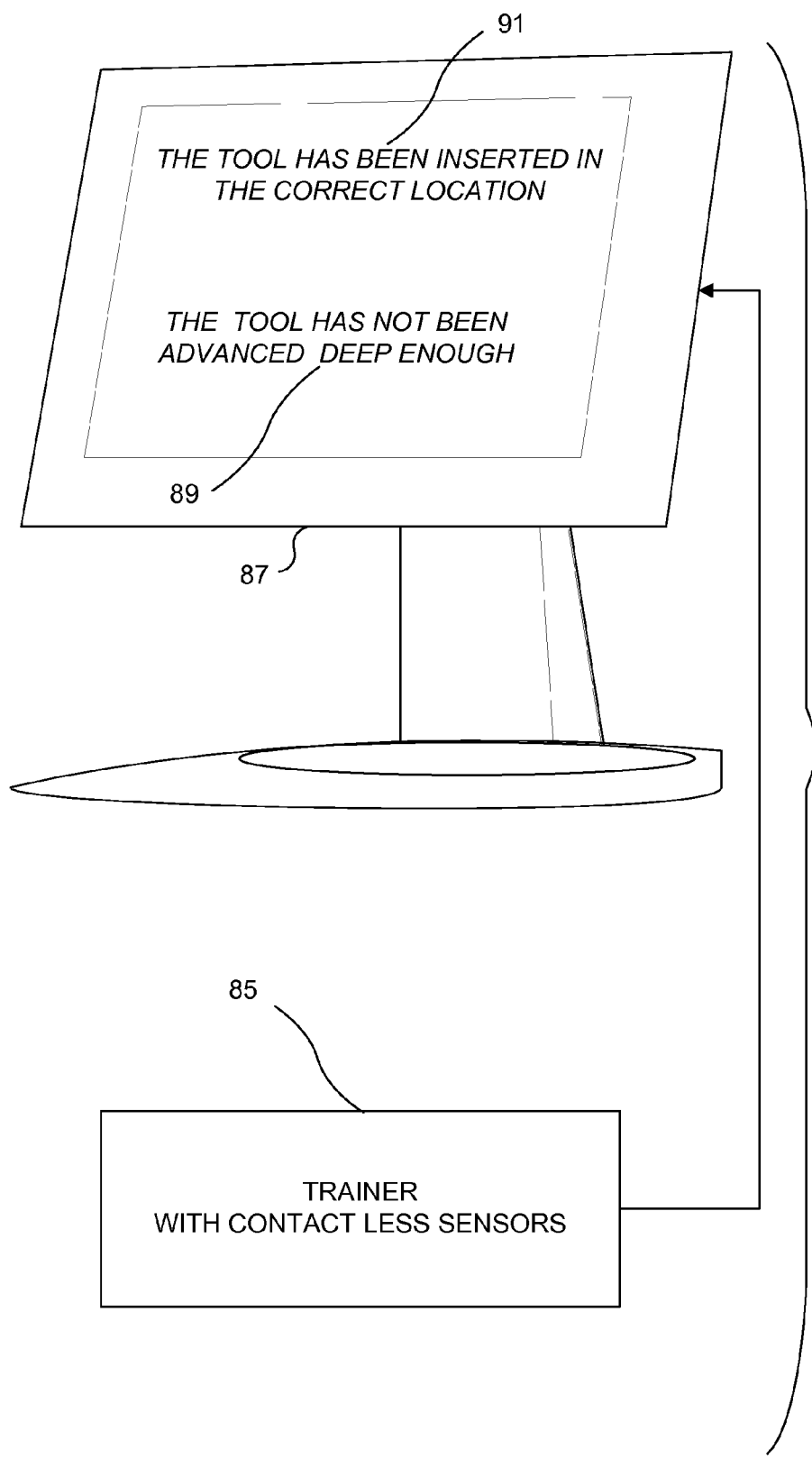
Figure 11:
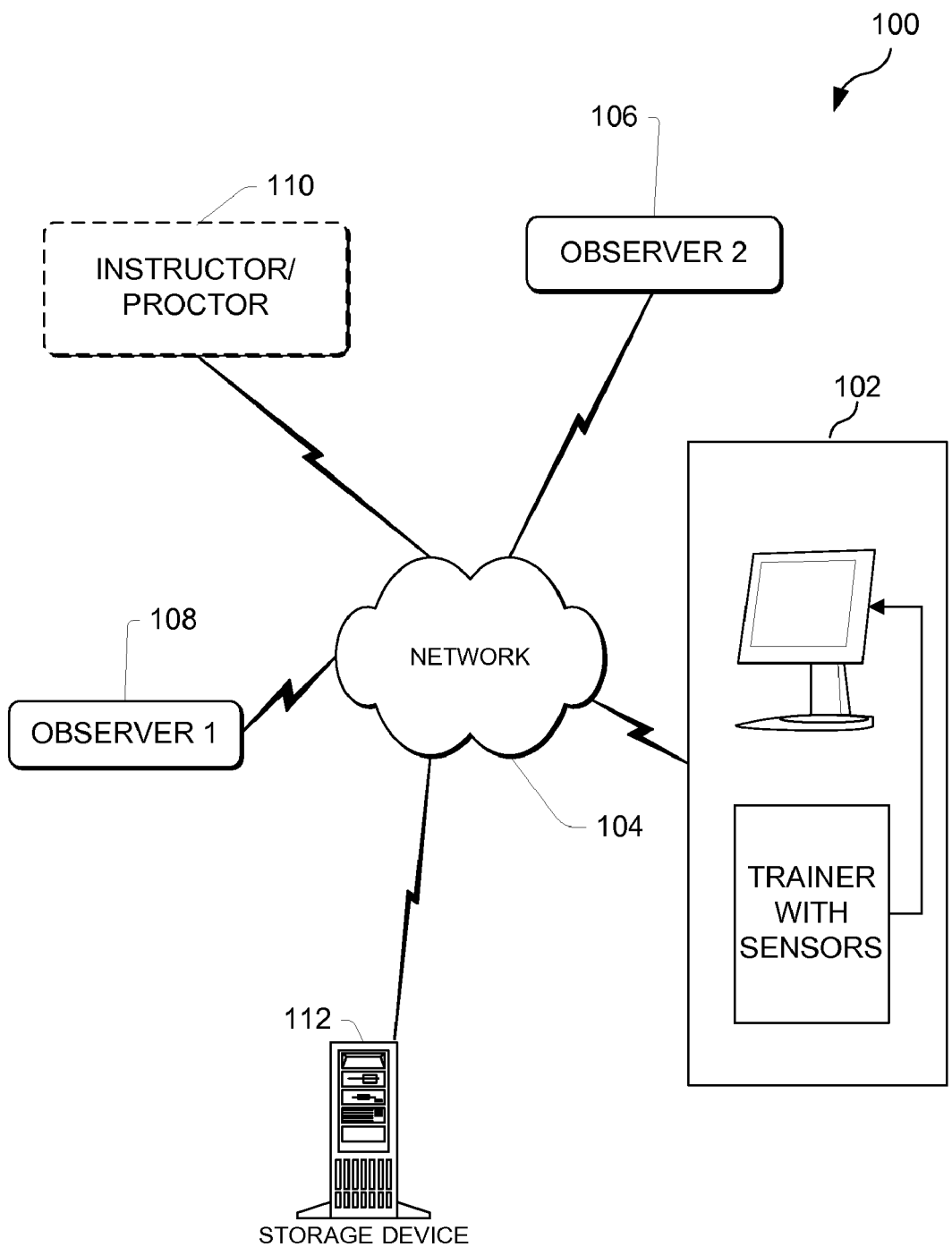
Figure 12:
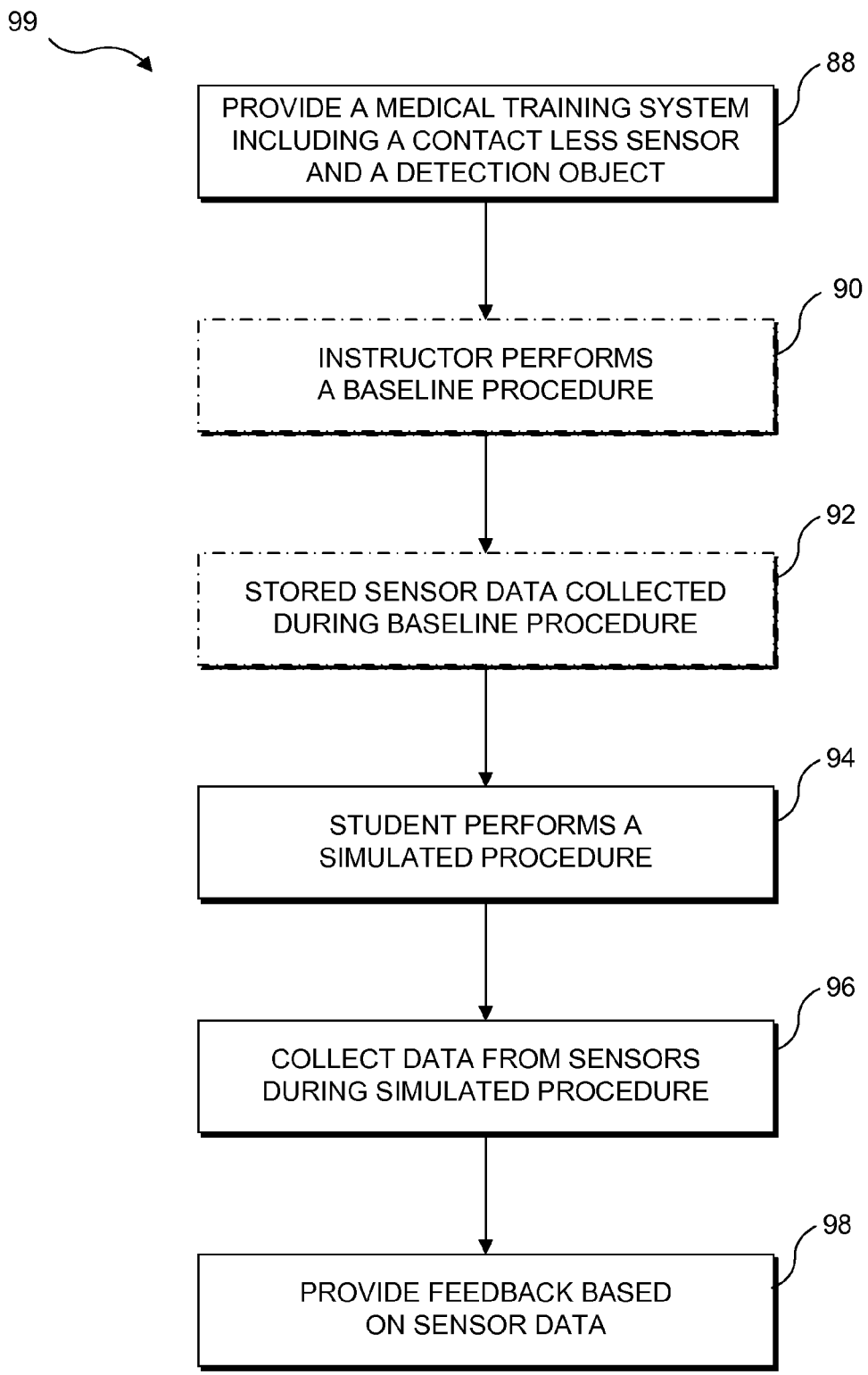
Figure 13:
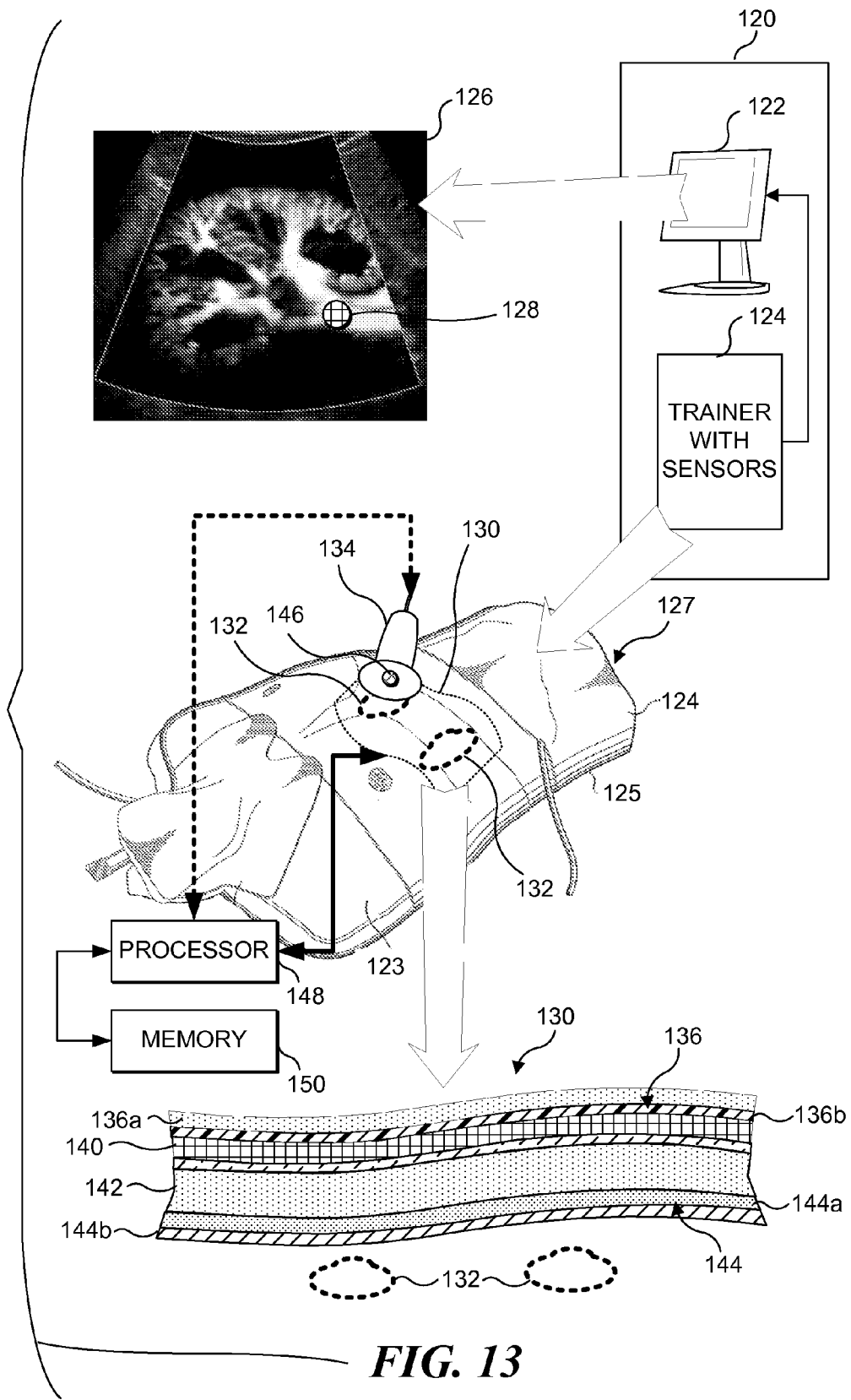

FIG. 3 schematically illustrates a medical model including a plurality of detection objects incorporated into the medical model, and a plurality of contact-less sensors disposed on a distal end of a simulated medical instrument, so that only certain detection objects trigger specific sensors;

FIG. 4 schematically illustrates a medical model including a plurality of detection objects incorporated into the medical model, and a single contact-less sensor disposed on a distal end of a simulated medical instrument, so that each detection object can be uniquely identified by the sensor;

FIG. 5 schematically illustrates a medical model including a plurality of capacitance-based sensors configured to detect a simulated medical instrument;

FIG. 6 schematically illustrates a medical model including a plurality of evaluation circuits configured to receive a current induced by an inductor disposed on a distal end of a simulated medical instrument;

FIG. 7 schematically illustrates a medical model including plate capacitors disposed proximate a simulated esophagus, the plate capacitors being configured to detect a simulated medical instrument being advanced into the simulated esophagus;

FIGS. 8A and 8B schematically illustrate a simulated joint incorporating ring shaped contact-less sensors configured to evaluate if a trainee has correctly positioned a syringe relative to the joint during an aspiration of the joint;

FIG. 9A schematically illustrates a box trainer including a sensor bed and a replaceable simulated physiological structure including detection objects;

FIG. 9B schematically illustrates the replaceable simulated physiological structure of FIG. 9A with a portion of the simulated physiological structure having been dissected, such that the sensor bed detects the dissection of that portion;

FIG. 10 schematically illustrates a medical training system including contact-less sensors coupled to a computing system to provide feedback to a trainee during a simulated medical procedure or training exercise;

FIG. 11 schematically illustrates an exemplary configuration in which a training system including contact-less sensors in accord with the present invention is coupled to a network, so sensor data and/or evaluation data relating to a training exercise obtained using the contact-less sensors are transmitted to remote observers who are also coupled to the network;

FIG. 12 is a flowchart showing the sequence of logical steps employed to utilize contact-less sensors to collect data to be used to generate an evaluation of the performance of a training exercise or a simulated medical procedure; and FIG. 13 schematically illustrates a medical training system including contact-less sensors coupled to a computing system to simulate an ultrasound examination.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

In the present invention, one or more sensors are incorporated into a medical training model that can be used for teaching and/or testing. Such sensors can be employed to provide feedback indicating how well a simulated procedure was performed using the medical training model. Each medical model preferably includes one or more simulated physiological structures. Preferably, much of the model, and in particular the simulated physiological structures, are formed out of elastomeric materials to enhance a realism of the medical training model.

The sensors used in the present invention do not require physical contact between the sensor and an object that is to be detected and are therefore referred to as "contact-less sensors." In the context of the present invention, the object to be detected is generally a tool used during a simulated medical procedure (although in some embodiments, a sensor is incorporated into such a tool, to detect objects incorporated into the model). Generally, the detection object or tool will be either an actual medical instrument, or a simulated medial instrument. Syringes, needles, scalpels, forceps, endoscopes, and laparoscopes are but a few of the tools that might be employed in a simulated medical procedure. Employing sensors that can detect a tool without requiring that there be actual physical contact between the tool and the sensor enables the sensors to be hidden from view. Hidden sensors are preferable for at least two reasons. First, hidden sensors enable a more realistic medical training model to be achieved (because a simulated physiological structure with clearly visible sensors would not look realistic); and second, if such sensors were visible to a student, the student might be able to identify a target location corresponding to a simulated medical procedure simply by noticing the sensors disposed adjacent to the target location.

The term "simulated medical procedure" is intended to encompass training activities corresponding to actual medical procedures (e.g., an endoscopic examination of the upper gastrointestinal tract), as well as training activities involving the use of the medical model, which do not correspond to any particular medical procedure. The term contact-less sensor is intended to encompass all sensors that are capable of detecting the proximity of a detection object (such as the tool described above) without requiring that there be physical contact between the sensor and the detection object.

Regardless of the sensor technology used, preferably, the sensor is positioned sufficiently close to a portion of the medical model involved in a specific simulated medical procedure, so that when a student correctly uses the tool to perform the simulated medical procedure, the sensor will detect the presence of the tool.

Many different types of contact-less sensors are available. The following types of contact-less sensors are intended to be exemplary, rather than limiting on the scope of this invention. Magnetic sensors (including, but not limited to, reed switches), Hall effect sensors, impedance-based sensors (including but not limited to the use of ultra-wide band impedance sensors), capacitance-based sensors, and giant magnetoresistive sensors can be employed for practicing the present invention. Combinations of infrared (IR) emitters and receivers can also be utilized. Factors relevant to the selection of a particular sensor include cost, range, sensitivity, and the preferred material of the tool or detection object to be detected.

Contact-less sensors can be separated into two broad categories, including analog sensors and digital sensors. Analog sensors provide a signal where, for example, the amplitude of the signal varies based on a distance between the sensor and the detection object. Digital sensors, like the reed switch noted above, function like on/off or binary switches. Selection of an analog sensor or a digital sensor is based in part on how the sensor data are to be evaluated. For example, if a precise 3-dimensional positioning determination is desired, a plurality of analog sensors will be preferred (to enable positioning data to be determined using triangulation).

Certain sensor technologies require the use of a tool having a property that can be detected by the sensor. For example, some contact-less sensor technologies rely on the sensor detecting a target object using magnetic properties (such as reed switches). Reed switches are digital sensors that are triggered by the presence of a magnetic field of sufficient strength. In embodiments that employ a reed switch as a contact-less sensor, the tool used to perform the simulated medical procedure (or the detection object placed in proximity of the sensor during the procedure) must include a magnet capable of triggering the reed switch. If the simulated medical procedure requires the use of an actual or a simulated endoscope, a portion of such a tool can be formed from a magnetic material, or a magnet having a magnetic field sufficiently strong to trigger the reed switch can be incorporated into the tool. The strength of the magnetic field required to trigger the reed switch will be a function of the sensitivity of the reed switch, as well as the distance between the reed switch and the tool as it is employed in a simulated medical procedure. If, in a particular medical model, magnets cannot be used, then reed switches will be inappropriate and some other sensor technology must instead be used. Hall effect sensors detect the presence or the interruption of a magnetic field by producing either a digital signal or an analog output proportional to the magnetic field strength.

Capacitance-based sensors measure a change in capacitance, and that change is a function of a distance between a capacitor element and an object (comprising another capacitance element) affecting the baseline charge of the capacitor. Thus, capacitance-based sensors can be used as analog sensors, although they are also often available as digital (on/off) sensors. For example, as a simulated instrument is brought closer to a capacitance sensor, the baseline capacitance of the sensor increases. Capacitance sensors can therefore be used to determine the relative proximity between the sensor and an object and are thus useful in enabling a medical training model to provide feedback about the proximity (and the degree of proximity) of an object relative to the sensor. To achieve a realistic model, such sensors will preferably be encapsulated or covered with a realistic elastomeric based simulated tissue, to enhance the training experience. Capacitive sensors can respond to all types of materials, and thus, can be used with tools that are non-magnetic and non-metallic. The higher the dielectric constant of the target material, the greater the sensing range of the capacitive sensor.

Non-conductive detection objects can be used with impedance sensors. Both capacitance and impedance sensors can measure perturbations in spatially resolved, fringing electric fields. These fields are generated by applying a voltage across precisely patterned metal electrodes. As the sensor is brought near the detection object (or vice-versa), the electric field is altered. This small perturbation is measured as a change in capacitance or impedance by the sensor. In the case of a capacitance sensor, the sensor capacitance is decreased as it approaches a grounded detection object due to the effective shorting of some of its electric field lines. In the case of an impedance sensor, penetration of the detection object by the sensor's electric fields enables a precise response to the object's dielectric properties.

Inductive sensors are solid state sensors having three main components, including an oscillator, a triggering circuit, and a switching amplifier. The oscillator generates a high-frequency electromagnetic field in the sensor's target area. When a metal (preferably a ferrous metal) target enters the target area, eddy currents created in the target by the oscillator increase the load on the oscillator. When used as a digital sensor, at a specific load, the trigger circuit senses the reduction in oscillation and signals the switching amplifier to change the state of the sensor (e.g., "on" versus "off"). Inductive sensors can also be configured as analog sensors, whose signal output varies based on the distance between the metal target and the sensor. Inductive sensors detect metallic materials, and thus cannot be used with tools that are substantially non metallic.

While the use of sensors at plurality of different locations in a medical model is preferred (enabling more data points to be obtained, and facilitating more complex evaluations to be achieved), a single sensor disposed proximate to a particularly critical location might be beneficially employed. As noted above, a single sensor can be incorporated into the tool to be utilized, and detection objects can be incorporated into the medical model, which is useful where the sensors are more expensive than the detection objects. This approach enables a simpler medical model to be achieved (only the sensor incorporated into the tool needs to be logically coupled to a processor, as opposed to a plurality of sensors distributed throughout a medical model that must be coupled to a processor).

Sensors (or detection objects capable of triggering a sensor integrated into a tool) that are incorporated into medical models and simulated physiological structures can be used in a variety of different ways. Three significant uses include collection of data, which are stored for later use, collection of data to be processed to provide a contemporaneous feedback (such as a visual or an audible indication that a procedure has been performed correctly or incorrectly), which is provided to a trainee, a proctor, or both, and collection of data that are analyzed and may be used to trigger a simulated physiological response in the model or in the simulated physiological structure (e.g., a change in a simulated heartbeat, a simulated muscular response, a change in a simulated respiratory rate, etc.—all of which can be effected by controlling a servo or pump). In a relatively simple implementation, the sensor signal is used to provide a simple feedback, such as turning lights on or off, and/or the activation of aural, verbal, or textual prompts or cues. More complex sensor metrics involve determining a position of a simulated medical instrument (such as a needle, a catheter, an endoscope, or other tool) during each phase of a simulated procedure. The sensor data can be manipulated and analyzed by a logical processing device, such as a computer. Using a computer enables sensor data to be immediately processed and displayed, immediately processed but stored for later use, stored for later processing, compared to similar data, electronically distributed to other users in a network, or any combination thereof.

Instead of providing immediate feedback to a user, the feedback can be hidden from the user, and instead made available to an instructor. Based upon the feedback thus provided, the instructor may "grade" the performance of the student. Such an application will be particularly useful in skill assessments of medical personnel in training or for proficiency certification.

Such sensors may not only be disposed at a target location at which a simulated medical procedure is to be performed, but they also can be disposed at other portions of the medical model. For example, consider a simulated medical procedure in which a student is required to locate a stomach tumor within a medical model (configured as a mannequin) that includes a mouth, a throat, an esophagus and a stomach. The simulated medical procedure requires the student to introduce endoscopic instruments into the stomach via the mouth. Sensors disposed proximate to the simulated stomach tumor will detect when a student has positioned a tool (such as a simulated or actual endoscope used to locate the stomach tumor) proximate the simulated stomach tumor, indicating that the student has correctly identified the stomach tumor. Other sensors can be disposed in other portions of the stomach to detect that the student has not properly positioned the tool adjacent to the stomach tumor. A sensor disposed at the entrance of the mouth will detect when the student introduces the tool into the model, as well as detecting when the tool is withdrawn from the model (providing an elapsed time for the entire simulated procedure). Sensors disposed adjacent to the beginning and end of the esophagus can be used to determine the time required by the student to advance the tool through the esophagus. Sensors disposed throughout the stomach at locations other than at the stomach tumor can be used to determine the number of other sites in the stomach that the student examined before identifying the tumor.

The following describes several preferred surgical simulators (i.e., medical models) incorporating contact-less sensors. It should be understood, however, that many other different medical models can benefit from the incorporation of contact-less sensors, and the following embodiments are intended to be exemplary, rather than limiting of the scope of the invention.

Figure 1:
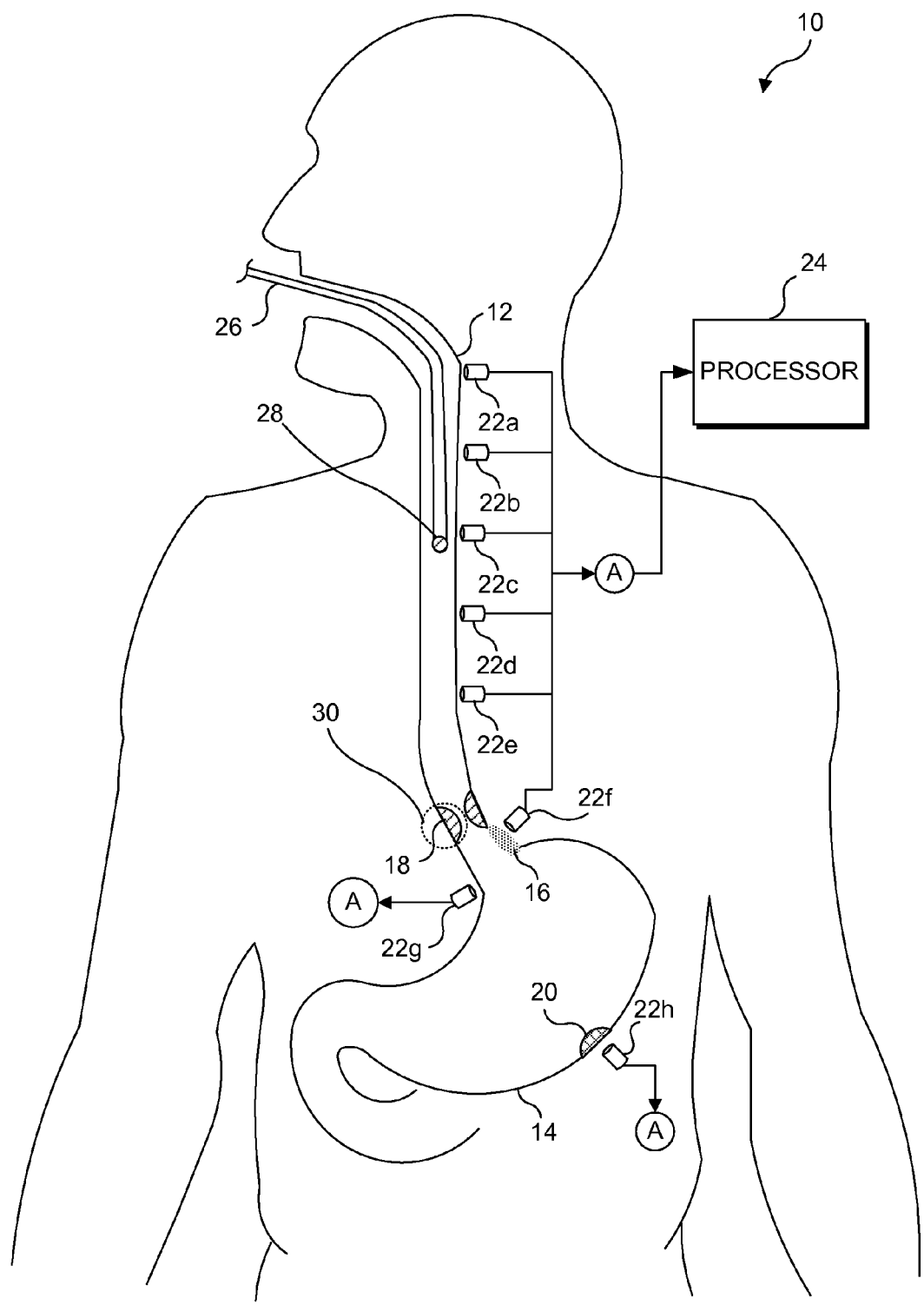

FIG. 1 schematically illustrates a medical model 10 that includes a plurality of contact-less sensors. It should be understood that simpler models including fewer contact-less sensors (e.g., including a single contact-less sensor), as well as more complex medical models including more contact-less sensors can be achieved, as required. Thus, the number of contact-less sensors illustrated in the following embodiments are merely exemplary, rather than limiting of the scope of the present invention.

Medical model 10 includes a simulated esophagus 12 and a simulated stomach 14. Preferably, these simulated anatomical structures are formed at least in part from elastomeric materials, such that a realistic training model is achieved. Portions of the training model not being utilized in training exercises need not be anatomically correct or realistic in appearance. Esophagus 12 includes simulated abnormal tissue 16 and an esophageal stricture 18, although it should be understood that other medical conditions can also be readily simulated.

Abnormal tissue and esophageal stricture are commonly associated with gastroesophageal reflux disease (GERD), a very common disorder. GERD occurs when the sphincter muscle at the bottom of the esophagus (not shown in FIG. 1) relaxes and regularly allows stomach acid into the esophagus. GERD is characterized by symptoms and/or tissue damage resulting from repeated or prolonged exposure of the lining of the esophagus to stomach acid. One type of tissue damage that can occur is referred to as Barrett's esophagus, in which the normal tissue lining the esophagus is replaced by tissue normally found in the stomach (i.e., acid-resistant tissue). While the tissue replacement may be a defense mechanism, the presence of such abnormal tissue within the esophagus has been clinically identified as being a risk factor for adenocarcinoma (cancer of the lower esophagus). Thus, abnormal tissue 16 is associated with Barrett's esophagus.

A second type of tissue damage associated with GERD is an esophageal stricture. The lower esophagus can open to the size of a quarter or wider. When recurrent inflammation occurs in the esophagus, scarring develops, underlying tissues become fibrous, and the opening narrows. In advanced cases, this narrowing, or stricture, can be severe. The opening may be reduced to the size of a pencil or even smaller. The processing of food and liquids are delayed, and they only move slowly across the opening into the stomach. A large piece of food, such as a bite of meat, may completely block the esophagus. Thus, stricture 18 is also associated with GERD.

Medical instruments may be inserted into the esophagus to perform diagnosis or treatment related to GERD. The medical instrument can provide images to the physician, since the tissue associated with Barrett's esophagus is readily identifiable. The medical instrument may also be used to obtain a biopsy of abnormal tissue in the esophagus, to determine if any of the abnormal tissue is cancerous. Medical instruments inserted in the esophagus can be used to dilate a stricture. One dilation technique involves positioning a deflated balloon within the stricture, and then inflating the balloon to dilate the opening. Simulated tool 26 can thus be configured to simulate an endoscope, a tissue sampler, a dilator, or other medical instrument. If desired, stricture 18 can be formed using a fluid-filled bladder, so that the dilation forces fluid out of the bladder into a reservoir, enabling the stricture to be reduced in size. Fluid can then be forced from the reservoir back into the bladder, increasing the size of the stricture so that the dilation procedure can be simulated repetitively. The dilation procedure is similar to balloon angioplasty, and the same principles can be employed to simulate balloon angioplasty in an appropriately configured simulated physiological structure. Medical model 10 can be used to train students in locating and identifying strictures and abnormal tissue associated with GERD. Sensors disposed proximate stricture 18 and abnormal tissue 16 can be used to determine if a student has positioned an imaging tool immediately adjacent to such structures. Where stricture 18 is implemented as a fluid filled balloon, a contact-less sensor can be employed to determine if the structure is properly dilated, as discussed in detail below, in connection with FIGS. 2A and 2B.

As noted above, medical model 10 includes a simulated stomach tumor 20. A contact-less sensor disposed proximate stomach tumor 20 can be used to determine if a student has positioned an imaging tool immediately adjacent to stomach tumor 20. Furthermore, a contact-less sensor can be used to determine if such a structure is properly removed, as discussed in detail below, in connection with FIGS. 9A and 9B.

Medical model 10 further includes a plurality of contact-less sensors 22a-22h. Sensors 22a-e are disposed at regular intervals along esophagus 12. Sensor 22f is disposed adjacent to abnormal tissue 16. Sensor 22g is disposed at the junction of esophagus 12 and stomach 14. Sensor 22h is disposed adjacent a stomach tumor 20. Each contact-less sensor is coupled to a processor 24 (as indicated by connector A), which can be a separate component or integrated into medical model 10. A separate processor will reduce the cost and complexity of medical model 10. Ubiquitous personal computers can be used to implement the functions of processor 24, or a dedicated processor can instead be employed. The processor can be coupled with a display so that a trainee can receive feedback during a simulated procedure (as shown in FIG. 10, as discussed in detail below), or the data collected by the contact-less sensors can be provided only to a proctor and/or saved for later review. It should be understood that each individual contact-less sensor is coupled to processor 24 so that the processor can track data from the individual sensors. While FIG. 1 schematically shows a cross section of medical model 10, it should be understood that the contact-less sensors disposed adjacent to esophagus 12 can be disposed in a radial pattern about esophagus 12.

A distal end of simulated tool 26 includes a detection target 28, specifically selected to trigger the contact-less sensors selected. In one embodiment, detection target 28 is a magnet, and each contact-less sensor is either a Hall Effect sensor, a reed switch, or other magnetic sensor. As those of ordinary skill in the art will recognize, reed switches and many Hall Effect sensors are digital sensors. Digital sensors can be employed to evaluate a trainee's performance in the following manner.

In a hypothetical training exercise involving medical model 10, a student is required to introduce tool 26 into esophagus 12. The student is informed that medical model 10 includes an abnormality in one of more of the esophagus and stomach. The evaluation of the student's performance includes determining whether the student correctly positions the tool at a location relevant to one or more abnormalities, and the length of time it took the student to advance the tool through the esophagus and into the stomach. Detection target 28 is disposed on the distal end of tool 26. Sensor 22a is disposed at the beginning of esophagus 12. When tool 26 is introduced into the esophagus, detection target 28 will trigger sensor 22a. A signal is sent from sensor 22a to processor 24, enabling processor 24 to obtain a timing reference point corresponding to the point in time at which the student introduced tool 26 into the esophagus. As detection target 28 passes by sensors 22b, 22c, 22d, and 22e, additional timing reference points are sent from the sensors to processor 24. FIG. 1 does not include any sensors disposed immediately adjacent to stricture 18, although it should be understood that if desired, additional sensors can be placed adjacent to stricture 18. Depending on the relative sizes of stricture 18 and tool 26, the student may be required to dilate stricture 18 in order to gain access to stomach 14 (as discussed in detail below, in connection with FIGS. 2A and 2B).

Sensor 22g is disposed at the juncture between esophagus 12 and stomach 14. As detection target 28 moves past sensor 22g, a signal is sent to processor 24, providing a timing reference point corresponding to the point in time at which the student has successfully advanced tool 26 through esophagus 12 into stomach 14. Thus, a potential metric with which the student's performance can be evaluated is the length of time it took the student to successfully advance tool 26 through esophagus 12 into stomach 14 compared with the length of time required by a skilled practitioner to complete the same action.

Sensor 22f is disposed immediately adjacent to abnormal tissue 16. Preferably, sensor 22f is calibrated such that if tool 26 is not disposed immediately adjacent to abnormal tissue 16, but rather passes through esophagus 12 closer to sensor 22g than sensor 22f, sensor 22f will not be triggered. If sensor 22g is triggered and sensor 22f is not triggered, it can be concluded that the student failed to locate abnormal tissue 16. Alternatively, the student can be instructed that if any abnormal tissue or a tumor is located, the student should hold the tool immediately adjacent to the abnormal tissue or the tumor for a period of at least 30 seconds. Processor 24 can then be configured to evaluate the signal from sensor 22f (or sensor 22h) to determine if the sensor remains triggered for at least 30 seconds. If the sensor is triggered for less than 30 seconds, it will be concluded that the student passed the tool by the abnormal tissue or tumor, but failed to recognize the abnormal tissue or tumor. Failure to recognize an abnormal tissue or tumor will lower the student's score, and if desired, may indicate that the student failed the training exercise.

In the training exercise described above, sensors 22b-22e, while each providing a timing reference point providing data relating to the position of the tool within esophagus 12 at various times, are not specifically required to determine the length of time required by the student to advance the tool through the esophagus into the stomach (sensor 22a, disposed at the beginning of the esophagus, and sensors 22f and 22g, disposed at the end of the esophagus, are sufficient for that purpose) and could be eliminated if it is desired to reduce the cost and complexity of medical model 10.

Figure 2A:
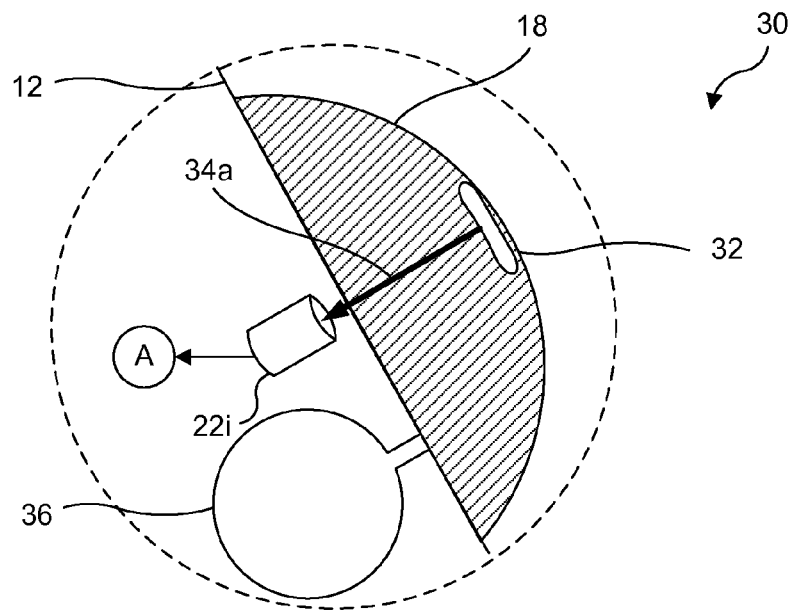
FIG. 2A is an enlarged view of a portion of the medical model of FIG. 1, illustrating an esophageal stricture substantially protruding into the esophagus.

As noted above, where stricture 18 is implemented as a fluid-filled balloon, a contact-less sensor can be used to determine if the stricture is properly dilated. A portion 30 of FIG. 1 corresponds to part of stricture 18 and esophagus 12. Portion 30 is shown in an enlarged view, in FIGS. 2A and 2B. In FIG. 2A, stricture 18 protrudes significantly into esophagus 12. A sensor 22i is incorporated into the wall of esophagus 12, immediately behind stricture 18, which includes a detection object 32 (such as a magnet). Note that a reservoir 36 is empty.

While not shown, it should be understood that a valve prevents fluid from stricture 18 from moving into reservoir 36, until a pressure is applied to stricture 18, thereby forcing fluid from stricture 18 into reservoir 36 (thus enabling stricture 18 to be reduced in size). As shown in FIG. 2A, the distance (as indicated by an arrow 34a) between detection object 32 and sensor 22i is sufficiently great, so that sensor 22i is not triggered.

Figure 2B:
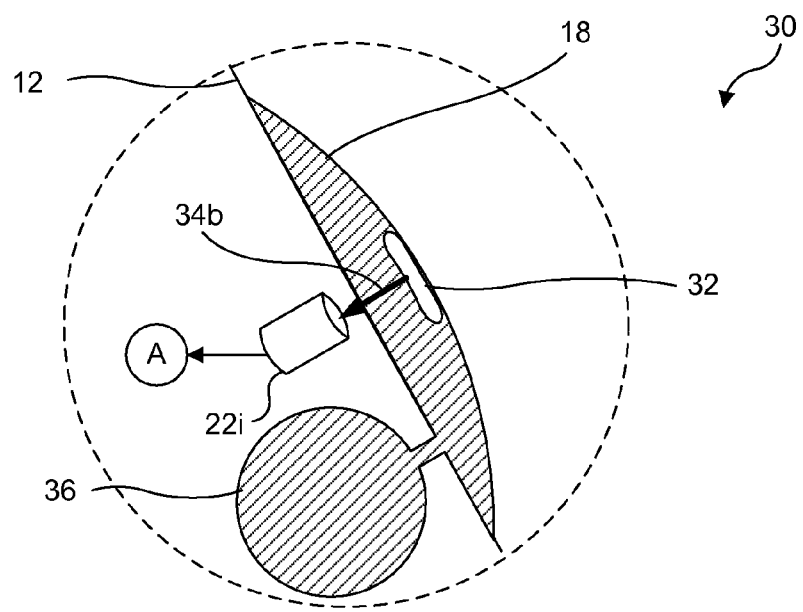
FIG. 2B is an enlarged view of a portion of the medical model of FIG. 1, illustrating the esophageal stricture after a simulated dilation procedure performed so that the esophageal stricture generally no longer protrudes into the esophagus.

In FIG. 2B, a tool such as a dilator has been used to apply pressure to stricture 18, forcing fluid from stricture 18 through the valve (not shown) into reservoir 36, so that stricture 18 is substantially reduced in size. Detection object 32 is now substantially closer to sensor 22i, as indicated by an arrow 34b, to trigger the sensor, which sends a signal to processor 24. The processor interprets the signal from sensor 22i as indicating that stricture 18 has been successfully dilated. While not separately shown, it should be understood that reservoir 36 can be equipped with a piston (or some other mechanism known in the art) to force fluid to move from reservoir 36 back into stricture 18, expanding stricture 18, and thereby placing medical model 10 in a condition to be used by another student in another stricture dilation exercise.

Referring once again to the hypothetical training exercise discussed above in connection with FIG. 1, detection target 28 was implemented as a magnet, and the contact-less sensors were implemented as magnetic sensors (such as reed switches or Hall Effect sensors). It should be noted that a single magnetic sensor could be used in place of detection target 28, and magnets could be used in place of sensors 22a-22h. The single magnetic sensor on tool 26 would be coupled to processor 24, and each time the magnetic sensor is tripped, the processor would be unable to determine which magnet (replacing sensors 22a-22h) caused the sensor to trip. Medical model 10a of FIG. 3 can be used with a tool having a sensor, so that the sensors need not be included within the medical model. The processor can then specifically determine which detection target tripped the sensor (using the logic described below), reducing the complexity of the medical model (because the detection targets included in medical model 10a need not be coupled to processor 24), as well as reducing the cost of a medical simulator using medical model 10a and tool 26a (because detection targets are generally cheaper than sensors, and fewer sensors are required). (Note that elements common to FIG. 1 and the other Figures retain their numbering from one Figure to the next.)

Medical model 10a of FIG. 3 is similar to medical model 10 of FIG. 1, and includes a simulated esophagus 12 and a simulated stomach 14. Magnets 40a, 40b, 40c, and 40d are also included. Magnet 40a is disposed at the beginning of esophagus 12, and magnets 40b and 40c are disposed at the end of the esophagus, adjacent to the portion of the medical model where the esophagus joins with the stomach. Magnet 40d is disposed adjacent to stimulated stomach tumor 20. As noted above, processor 24 can be incorporated into medical model 10a, or processor 24 can be implemented as a separate device, such as part of a personal computer. A tool 26a is used in connection with medical model 10a and includes sensors 38a and 38b disposed at the distal end of the tool. The sensors are logically coupled to processor 24. Preferably, sensors 38a and 38b are implemented as reed switches, although it will be understood that other magnetic sensors could instead be used. Significantly, sensors 38a and 38b are configured to respond to different levels of magnetic fields. For example, as tool 26a is introduced into esophagus 12, sensors 38a and 38b will pass by magnet 40a. Magnet 40a and sensors 38a and 38b have been selected so that the magnetic field produced by magnet 40a is sufficient to trigger sensor 38a, but not sensor 38b. Magnet 40b has also been selected to have a magnetic field sufficient to trigger sensor 38a (but not sensor 38b), while magnet 40c has been selected to have a magnetic field strength sufficient to trigger both sensor 38a and sensor 38b. Magnets 40b and 40c are disposed sufficiently far from each other so that as tool 26a is advanced through esophagus 12 and into stomach 14 (so sensors 38a and 38b pass by magnets 40b and 40c), sensor 38a is triggered twice, and sensor 38b is triggered once. Magnet 40d has been selected to have a magnetic field strength sufficient to trigger both sensor 38a and sensor 38b. Thus, if tool 26a is properly positioned relative to stomach tumor 20, sensor 38a and sensor 38b will each be triggered once.

The relative strengths of the magnets need to be selected based on the geometry of the medical model. For example, the magnetic fields produced by magnets 40a, 40b and 40c preferably should be capable of triggering their corresponding sensors when tool 26a is advanced into the esophagus sufficiently to pass by one of the magnets, even if the tool is disposed near a portion of the wall of the esophagus that is opposite the portion of the wall behind which the magnets are disposed. If desired, ring shaped magnets encircling the esophagus can be employed, or a plurality of individual magnets encircling the esophagus can be employed, to ensure the magnetic field is distributed throughout the esophagus adjacent to the magnets/detection objects, so that the tool cannot pass by a detection object without triggering the corresponding reed switch on the tool.

Processor 24 is therefore enabled to utilize the signals received from sensors 38a and 38b to determine where tool 26a is disposed within medical model 10a. For example, when processor 24 receives one signal from sensor 38a, and no sensor signal from sensor 38b, processor 24 is able to determine that tool 26a has just passed (or is disposed adjacent to) magnet 40a. When processor 24 receives two signals from sensor 38a and one signal from sensor 38b in close proximity to each other, processor 24 is able to determine that tool 26a has just passed by magnets 40b and 40c. When processor 24 receives one signal from sensor 38a and one signal from sensor 38b simultaneously, processor 24 is able to determine that tool 26a has just passed by (or is disposed adjacent to) magnet 40d.

Those of ordinary skill in the art will recognize that many different combinations of magnet strengths and magnet positions can be used to enable signals from sensors disposed on tools to be used to determine the portion of a medical model which the tool has just passed, or adjacent to which the tool is currently disposed. Thus, medical model 10a is intended to be exemplary, rather than limiting of the scope of this invention.

The detection objects used in medical model 10a require the use of a tool having more than one sensor, to be able to detect the different detection objects. FIG. 4 illustrates a medical model 10b that includes detection objects, which are uniquely discriminable by a single sensor. Thus, a tool 26b is required to include only a single sensor 42 on its distal end. Medical model 10b includes a detection object 44a disposed at the beginning of esophagus 12, a detection object 44b disposed at the juncture of esophagus 12 and stomach 14, and a detection object 44c disposed immediately adjacent to stomach tumor 20. Thus, medical model 10b is suitable for determining the time required by a student to advance tool 26b through the esophagus into the stomach, and also for determining whether the student is able to properly locate stomach tumor 20. It should be understood that the location of detection objects in medical model 10b, and the specific training exercises discussed herein are intended to be exemplary, rather than limiting of the scope of this invention.

It should also be understood that medical model 10b and tool 26b can be implemented using different types of sensors and detection objects. For example, detection objects 44a through 44c can be implemented using passive (i.e. short range) radiofrequency identification (RFID) tags, and sensor 42 can be implemented using an RFID tag reader. Those of ordinary skill in the art will recognize that RFID tags can be uniquely identified, and require no power (since all of the power required by the RFID tag is obtained from the RFID tag reader, when the RFID tag reader interrogates the RFID tag).

Alternatively, detection objects 44a-44c can be implemented using bar codes (or other optically distinguishable markers), which may be visible or non-visible to a user, and sensor 42 can be implemented with a single optical sensor capable lead of optically distinguishing different bar codes (or other forms of optical markings). Preferably, detection objects (and sensors) incorporated into medical models in accord with the present invention will be unobtrusive, such that their presence will not be apparent to the student. Invisible bar codes (i.e., bar codes made with infrared reflective ink) have been developed, and can be used without their presence being apparent to the student.

Digital and analog sensors have been discussed above. The reed switches used for the sensors in medical model 10a (FIG. 3) are digital sensors (i.e., they are either on or off). If sensor 42 is implemented using an analog sensor, then such a sensor can discriminate between detection objects 44a-44c. For example, sensor 42 can be implemented using an analog inductive sensor, configured to respond to masses of metal (the larger the mass the larger the response). Thus, detection objects 44a-44c could be implemented by different masses of the same type of metal, such that the inductive sensor is able to distinguish one mass from another.

In yet another embodiment, detection objects 44a-44c can be implemented using magnets having different magnetic field strengths, while sensor 42 is implemented as an analog Hall Effect sensor (or other analog magnetic sensor) that is capable of detecting the relative intensities of the field produced by the magnets. In still another embodiment, detection objects 44a-44c can be implemented using materials having different dielectric constants, such that the detection objects can be individually discriminated using an analog capacitance sensor (for sensor 42). For example, metal oxides have relatively high dielectric constants and can be readily discriminated from plastic and elastomeric materials that are used to construct medical model 10b. Not only will such metal oxides be readily discernible from the balance of the medical model, but the use of different metal oxides to implement each different detection object should enable sensor 42 to discriminate between different detection objects. In particular, strontium titanate and titanium dioxide have relatively high dielectric constants and should be usable in this invention.

Each of the embodiments discussed above in conjunction with FIG. 4 have used detection objects that do not require a power supply in order for the detection objects to be individually identifiable using a corresponding sensor. Implementing detection objects that require a power supply somewhat complicates the fabrication of medical model 10b, because such detection objects need to be coupled to a power supply, or include a battery that will have a limited operational life. Where such limitations are acceptable, detection objects 44a-44c can be implemented using IR transmitters, such that sensor 42 is implemented using an IR transceiver able to individually distinguish detection objects 44a-44c. Those of ordinary skill in the art will readily recognize that such IR transmitters can be implemented in a very unobtrusive manner, so as not to substantially reduce the realistic appearance of medical model 10b or be noticeable by a user.

Turning now to FIG. 5, a medical model 10c is illustrated that is configured to be used with a tool 26c. Medical model 10c includes abnormal tissue 16 disposed at the juncture between esophagus 12 and stomach 14, stomach tumor 20 disposed in stomach 14, and a stricture 18a (which has been dilated and does not substantially obstruct esophagus 12). As with medical model 10 of FIG. 1, medical model 10c includes a plurality of sensors that are incorporated into the medical model and which are logically coupled to processor 24. When a detection object triggers one of the sensors, a signal is sent to processor 24. Sensors 23a-23h are implemented using capacitance-based sensors. Such sensors respond when an object is introduced into the space adjacent to the sensor, where such an object changes the dielectric constant of the space. Thus, tool 26c does not need to incorporate a detection object at its distal end, because tool 26c is the detection object. As illustrated in FIG. 5, sensors 23a, 23b, and 23c are triggered, and sensors 23d-23h have yet to be triggered.

FIG. 6 illustrates a medical model 10d, including esophagus 12 and stomach 14, which is configured to be used with a tool 26d that includes an inductor 46 disposed at its distal end. Medical model 10d further includes a plurality of evaluation circuits 48. Each of these evaluation circuits is logically coupled to processor 24. The function of inductor 46 is to induce an electrical current inside each circuit 48 adjacent to inductor 46. Electrical induction can be achieved using a rotating magnet or an energized coil. While powerful and relatively small rare earth magnets (such as neodymium-iron-boron magnets) are readily available, given the relatively small size of esophagus 12, it is more likely that inductor 46 will be implemented as an energized circuit (or electro-magnetic coil). Once tool 26d is inserted into esophagus 12 and inductor 46 is energized, the position of the distal end of the simulated medical instrument (e.g., tool 26d) can be determined by monitoring the plurality of evaluation circuits 48. Inductor 46 induces a current to flow in the evaluation circuits that are close to the inductor. Those of ordinary skill in the art will recognize that factors such as the distance from the inductor to the evaluation circuits and the design of the inductor will determine how many of the evaluation circuits will experience an induced current and that the amplitude of the current will depend upon the distance between the tool and the evaluation circuits. As shown in FIG. 6, three evaluation circuits 48a, 48b and 48c on the right and three evaluation circuits 48d, 48e and 48f on the left are shown in bold, indicating that these evaluation circuits are experiencing an induced current. The evaluation circuits thus respond to the location of inductor 46 without any physical contact by the simulated tool, and thus, each evaluation circuit functions as a contact-less sensor. Furthermore, because evaluation circuits 48b and 48e are disposed closest to inductor 46, a greater current will be induced in evaluation circuits 48b and 48e than in evaluation circuits 48a, 48c, 48d and 48f. Feedback provided by the evaluation circuits in medical model 10d is therefore based not only on the presence of an induced current, but also on the magnitude of the induced current. This embodiment is in contrast to the sensor/detection object combinations discussed above, many of which provide feedback solely based on whether the sensor is in an on or off state (e.g. a binary digital response as opposed to an analog response).

By monitoring the magnitude of the electrical currents flowing in the evaluation circuits, the evaluation circuits can be used to determine the position of the distal end of tool 26d. As a result, medical model 10d can be used to provide feedback about several different simulated esophageal procedures. In a simulated diagnostic procedure, feedback can be provided when, or if, the trainee properly positions an endoscope adjacent to simulated abnormal tissue 16. In a simulated biopsy, feedback can be provided when, or if, the trainee properly positions a tissue sampler to obtain a sample of simulated abnormal tissue 16, as opposed to normal esophageal tissue. In a simulated dilation procedure, feedback can be provided to determine if the trainee has properly positioned the dilator to expand stricture 18a. As noted above, other sensors can be used to determine if a fluid-filled stricture has been properly dilated.

FIG. 7 illustrates a medical model 10e, which includes a capacitance-based evaluation circuit configured in a significantly different orientation. In medical model 10e opposite sides of esophagus 12 are configured as opposed plates 50a and 50b of a capacitor, and the air in the esophagus is the dielectric between the opposed plates. When tool 26d is introduced into the gap between the opposed plates of this capacitor (i.e., into the dielectric), the baseline charge of the capacitor changes. This effect can be used to determine the location of the distal end of a simulated medical instrument (e.g., tool 26d) relative to the esophagus. Such a capacitance sensing circuit is logically coupled to processor 24. While not specifically shown, it should be understood that medical model 10e can beneficially incorporate elements such as abnormal tissue, strictures and tumors as shown in the other medical models discussed above. In yet another embodiment, one wall of esophagus 12 (e.g., plate 50a) can be configured as a first plate of a capacitor, while simulated tool 26d serves as the second plate of the capacitor (in this embodiment, plate 50b is not required). As the position of simulated tool 26d changes relative to the portion of the esophagus configured as the plate of the capacitor, the baseline charge of the capacitor changes and is measured.

While all of the medical models illustrated in the preceding Figures and discussed in detail above have generally corresponded to a torso and related internal body cavities of a human, it should be understood that the present invention is not limited to application only in such medical models, but can also be implemented in many other different types of medical models, simulating many different types of anatomical structures. FIGS. 8A and 8B schematically illustrate how contact-less sensors/detection objects are used in regard to a simulated knee 52 and a tool 54. It should be understood that other joints can be simulated, and the present invention is not intended to be limited in application only to simulated knees. A common medical procedure performed on joints is aspirating accumulated liquid from the interior of the joint. This procedure is schematically illustrated in FIG. 8A, which shows the needle of tool 54 (a syringe) being inserted into simulated knee 52. Simulated knee 52 accurately represents an actual knee and the tissue adjacent thereto. Elastomers are used to simulate tissues such as skin, muscle, and fat. More rigid polymers can be employed to simulate bone, cartilage, tendons and or the ligaments associated with the knee. Simulated knee 52 includes sensors 56a-56d configured to evaluate aspiration of the simulated knee. It should be understood that other joint-related procedures can also be simulated, and sensor configurations can be specifically provided to evaluate a specific procedure on such a joint. Thus, the present invention is not intended to be limited to evaluating aspiration of joints.

Sensor 56a is disposed adjacent to a skin layer of simulated knee 52, to determine if a person doing the procedure has selected the proper position for insertion of tool 54. As illustrated, sensor 56a is a ring shaped sensor, which is triggered when tool 54 is inserted generally into the center of the annulus defined by ring sensor 56a. While not specifically shown, it should be understood that each sensor in FIGS. 8A and 8B is logically coupled to a processor as discussed above. Inductance-based ring sensors are available from various manufacturers and respond to the proximity of metals. Therefore tool 54, specifically the needle portion of the syringe, is preferably formed of a metal material. Where ring sensor 56a is implemented as a digital sensor, triggering the sensor will only indicate that the tool has been inserted generally into the center of the annulus defined by the ring sensor, thereby enabling a pass/fail grade to be provided regarding insertion location of tool 54. When ring sensor 56a is implemented as an analog sensor, the processor can determine into what portion of the central region defined by the annulus of the ring sensor that tool 54 has been inserted, enabling the processor to provide a higher grade for insertions located closer to the center than an insertion that is off-center within the annulus defined by ring sensor 56a.

FIG. 8B schematically illustrates ring sensors 56b, 56c and 56d, which are configured to monitor a depth to which tool 54 is inserted into knee 52. Sensors 56b, 56c and 56d are thus configured to determine if the needle of the syringe has been inserted into knee 52 along a desired track, and to an appropriate depth. As noted above, if the sensors are digital sensors, then the resulting evaluation will generally be a pass or fail grade. However, if the sensors are analog sensors, then a more quantitative grade can be provided based on how close to the center of each sensor the needle is inserted and based upon the relative depth (compared to the ideal depth) to which the needle is inserted.

FIGS. 9A and 9B schematically illustrate a box trainer and a simulated tissue structure incorporating the detection objects and contact-less sensors discussed above. Box trainers are often used to develop skills required for endoscopic and laparoscopic surgery. The box, which can be open or closed, simply provides a working space simulating an internal operating site. The exercise object, such as a simulated tissue structure, is inserted into the working area defined by the box. Endoscopic instruments are inserted into the working area to manipulate the exercise object. In open box trainers, such manipulation occurs while the student is looking directly at the simulated tissue structure. Some trainers use a system of mirrors to provide an image of the exercise object to the trainee, so that the trainee is not looking directly at the exercise object. Still other box trainers incorporate imaging devices, so that the trainee views an image of the exercise object on a display while the exercise object is being manipulated. Box trainer 60 as shown in FIGS. 9A and 9B can comprise any of the above-described types of box trainers. A sensor bed 64 is incorporated into a base 62 of box trainer 60. Preferably sensor bed 64 includes a plurality of sensors, although a basic embodiment may include only a single sensor. Because the exercise objects are generally considered to be disposable items, for cost considerations, it is preferred for the sensor to be part of the sensor bed/box trainer, which is used repeatedly. Generally, detection objects that can be detected by a sensor are cheaper than the sensors themselves, and it is preferable to treat a detection object as a disposable item rather than treating sensors as disposable items. Note that sensor bed 64 can be permanently incorporated into box trainer 60, or sensor bed can be removably attached to box trainer 60 such that a different sensor bed, specifically configured to detect different exercise objects, can be introduced into box trainer 60 as required. Furthermore, while box trainers are useful training tools, such a sensor bed could be used independently of a box trainer. A sensor bed configured to be used independently of a box trainer will include one or more contact-less sensors, and will be configured to support an exercise object. Such a stand alone sensor pad may be larger than the exercise object, or substantially the same size as the exercise object (stand alone sensor pads of the same size as the sensor object will facilitate proper positioning of the exercise object to the sensor pad/sensor bed). While not shown, it should be understood that each sensor is logically coupled to a processor as described above. Preferably, the sensor pad will include one or more data ports (such as a parallel port or a universal serial bus (USB) port) enabling the sensor pad to be coupled to a computing system (wherein the computing system includes the processor described above).

As shown in FIGS. 9A and 9B, sensor bed 64 is incorporated into a portion of base 62. It should be understood that some exercise objects can generally be as large as base 62, and in such cases, sensor bed 64 would be sized accordingly.

Simulated tissue structure 66 includes features 68, 70, and 72; and detection objects 74, 76, and 78. As discussed in detail above, the detection objects are selected based on the type of sensor included in sensor bed 64. In one embodiment, sensors 80, 82 and 84 in sensor bed 64 are implemented using magnetic sensors; such as reed switches or Hall Effect sensors. Detection objects 74, 76 and 78 can then be implemented using magnets of appropriate magnetic field strengths, such that when simulated tissue structure 66 is positioned properly relative to sensor bed 64, sensors 80, 82, and 84 are triggered. It should be understood that the magnetic sensors and magnets noted above are not the only types of detection objects and sensors that can be implemented in exercise objects and sensor pads. Other types of detection objects and sensors generally consistent with those discussed above can also be employed.

For sensor bed 64 and simulated tissue structure 66 to function properly, simulated tissue structure 66 needs to be accurately positioned relative to sensor bed 64. Several techniques can be used to enable such accurate positioning. In one embodiment, sensor bed 64 is visually distinguishable from the rest of base 62. For example, if the simulated tissue structure is 3 inches square, an appropriate sensor bed would also be about 3 inches square. Sensor bed 64 can be formed from a different color plastic than the rest of base 62, so that a trainee can readily identify on what portion of base 62 the simulated tissue structure needs to be positioned. Furthermore, one or more of the sensors in sensor bed 64 can be configured to detect a corresponding detection object in simulated tissue structure 66, such that when the simulated tissue structure is properly positioned relative to sensor bed 64, an audible or visual feedback is provided to the trainee to indicate that the simulated tissue structure is properly positioned. For example, detection objects 74 and 76 are disposed at opposed edges of simulated tissue structure 66. Sensor bed 64 includes a sensor 80 and a sensor 84. When simulated tissue structure 66 is properly positioned, sensor 80 is triggered by detection object 74, and sensor 84 is triggered by detection object 76. If digital sensors are employed, some degree of misalignment may still result in the feedback being provided to the trainee that the simulated tissue structure is properly positioned. If analog sensors are implemented, more quantitative feedback can be provided to the trainee, until the simulated tissue structure is more precisely positioned (e.g., the more accurately positioned the simulated tissue structure is, the greater will be the magnitude of the signals provided by sensors 80 and 84). As shown in FIG. 9A, when simulated tissue structure 66 is properly positioned relative to sensor bed 64, sensor 80 is triggered by detection object 74, and sensor 84 is triggered by detection object 76. Note that detection object 74 and sensor 80 are aligned, and detection object 76 and sensor 84 are aligned. As shown in FIG. 9A, when simulated tissue structure 66 is properly positioned, the sensors are disposed underneath a surface supporting the simulated physiological structure, so that each contact-less sensor and their respective detection object shares a common axis and are adjacent, with the sensors being disposed beneath their respective detection objects.

Simulated tissue structure 66 is useful in the following exercise. The trainee is provided box trainer 60 and simulated tissue structure 66, as shown in FIG. 9A, is informed that one of features 68, 70, and 72 corresponds to a disease condition, and that the diseased tissue must be removed. Some aspect of feature 72, such as shape, color, or size will indicate to the student that feature 72 corresponds to the diseased tissue. The student will use endoscopic instruments 86 to dissect feature 72. Note that in this example, only feature 72 (which corresponds to the disease condition) includes a detection object. With feature 72 remaining attached to simulated tissue structure 66, sensor 82 is triggered by detection object 78. When the student successfully identifies feature 72 as being diseased tissue and correctly dissects feature 72 as shown in FIG. 9B, sensor 82 will no longer be triggered by detection object 78, and the processor can provide feedback to the student (or to a proctor) that the exercise was successfully completed. If however, the student incorrectly identifies feature 68 (or feature 70) as corresponding to the disease condition, and dissects feature 68 (or feature 70), the processor will determine that sensor 82 continues to be triggered by detection object 78, and that the student has failed the exercise. It should be understood that in this exercise, sensor bed 64, and simulated tissue structure 66 are merely exemplary, and are not intended to be limiting of the present invention. Those of ordinary skill in the art will readily recognize that many different configurations of sensor beds, detection objects incorporated into exercise objects such as simulated tissue structures, and exercises can be provided, consistent with the above description.

Note that the box trainer and exercise object described above together define a medical model that includes both detection objects and contact-less sensors. The other medical models described above include an esophagus and stomach (i.e., medical models 10, 10a, 10b, 10c, 10d, and 10e) and each required the use of a specific tool, where either a sensor or detection object was incorporated into the tool (or the tool itself was the detection object). The endoscopic tools discussed above in connection with the box trainer of FIGS. 9A and 9B are not required to include sensors or detection objects (although they optionally can), because the sensors are disposed in the sensor bed, and the detection objects are part of the simulated tissue structure (i.e., the exercise object).

FIG. 10 schematically illustrates one type of feedback that might be provided to a student using a trainer including contact-less sensors and corresponding detection objects in accord with the present invention. As shown in this Figure, a student is performing a training exercise using a trainer 85, which includes one or more contact-less sensors. A processor coupled to the sensors (as described above) is further coupled to a display 87. Based on the student's performance as measured by the sensors, the processor causes one or more messages to be displayed to the student. For example, a message 89 informs the student that the tool has not been advanced deep enough into the trainer. A message 91 informs the student that the tool has been inserted into the correct location. It should be understood that such messages are merely exemplary and are not intended to limit the scope of the present invention. As noted above, in some embodiments, no feedback will be provided to the student during the exercise. Instead, the feedback will be stored for later review and/or concurrently displayed to a proctor responsible for evaluating the student's performance during the exercise.

FIG. 11 schematically shows an exemplary configuration 100 in which a training system 102 is connected to a network 104 to share data collected during a training exercise, with remote observers 106 and 108, and optionally, with a remote instructor 110. It should be understood that the number of observers and instructors connected to network 104 can readily vary. Training system 102 can, for example, be based on any of the medical models discussed above, including those that simulate a human torso (i.e., models 10, 10a, 10b, 10c, 10d, and 10e), as well as medical models that are based on a sensor bed combined with one or more exercise objects. In addition to a medical trainer including a combination of contact-less sensors and detection objects (a sensor bed combined with an exercise object), or a medical model and tool including a combination of contact-less sensors and detection objects (medical models 10, 10a, 10b, 10c, 10d, and 10e), system 102 includes a computing device that is coupled to the network. The computing device receives sensor data (i.e., the computing device includes processor 24, as described above). If desired, the computing device can provide feedback via a display to the student during the training exercise (as described above in connection with FIG. 10). Sensor data (and/or an evaluation of the training exercise) can also be streamed to other users over network 104, which can be a private network used by a school or training facility, or a public network, such as the Internet. Such data can be provided to other students, or to a proctor who will evaluate the student's performance based on the data/feedback received via the network. The sensor data captured by the contact-less sensors can be stored in digital form, for example, on a hard drive (not separately shown) of the computing device of training system 102. If desired, the training system can also couple to a remote storage device 112 via network 104, to store the sensor data (or an evaluation based on the sensor data) remotely. Such remote storage is particularly useful in a scholastic environment, where students share a plurality of different training systems 102, so that each training system stores training data at a common remote storage device. The ability of the present invention to facilitate remote learning is significant. Instructor 110 can simply be in a different room or building on a college campus, or can be thousands of miles away from where the students are located.

FIG. 12 is a flow diagram 99 that generally shows the logic for using a medical training system including contact-less sensors and corresponding detection objects. As discussed above, such a medical training system can be implemented as a sensor bed and an exercise object, where sensors are permanently or removably incorporated into the box trainer, and corresponding detection objects are incorporated into the exercise object (which is preferably disposable). Such a medical training system can further alternatively be implemented as a medical model (such as the torso including a simulated esophagus and simulated stomach, or a simulated knee, both of which have been described above), in which a specific tool is used in connection with the medical model. Either the tool or the medical model will include one or more contact-less sensors, and the other of the tool or the medical model will include the corresponding detection objects. Note in some embodiments, the tool itself comprises a detection object.

In a block 88, a medical training system including contact-less sensors and corresponding detection objects is provided. In an optional block 90, an instructor (or qualified practitioner, such as a surgeon or other medical doctor) performs a baseline procedure using the medical training system. In an optional block 92, sensor data obtained when such a skilled practitioner or instructor successfully completes a simulated medical procedure/training exercise are stored. Such sensor data can be used as a baseline for comparison to sensor data collected from an identical simulated procedure/training exercise performed by a student and used to evaluate student sensor data. For example, referring to medical model 10b of FIG. 4, a training exercise based on introducing an instrument into the stomach via the esophagus, and successfully locating a stomach tumor can be implemented. The following three factors can be used to evaluate such an exercise (it should be understood that the use of the following three factors is exemplary, rather than limiting on the scope of the present the invention): (1) the time required to negotiate the esophagus with the tool; (2) the time required to locate the tumor once the tool was advanced into the stomach; and, (3) whether the tumor was successfully located. Only sensor data from the student's exercise are required to determine if the tumor was successfully identified. Sensor data obtained during a baseline procedure are useful in providing a reference relating to the time required for a student to negotiate the esophagus with the tool, and a reference relating to the time required for the student to locate the tumor. Based on the baseline procedure, the proctor or instructor can determine that a student ought to be able to perform these steps of the exercise, for example, in no more than twice the time required by the skilled practitioner. Thus, the sensor data obtained during the baseline procedure can be compared with the sensor data from the student exercise, to determine if the student meets the goal of performing the same procedural steps in no more than twice the time required by the skilled practitioner. Obtaining baseline sensor data is not required, because even when timing data could be obtained from a baseline procedure, a proctor or instructor could simply set timing goals based on experience, rather than on sensor data derived from performing a baseline procedure.

In a block 94, a student performs a simulated medical procedure (or a training exercise). If baseline sensor data have been collected, the student should perform an identical simulated medical procedure. In a block 96, sensor data are collected during the student's performance of the procedure. In a block 98, feedback is provided, based on the collected sensor data in comparison to the baseline sensor data.

The feedback provided is a function of how the processor is configured to manipulate the sensor data received from the contact-less sensors. In the training exercise noted above with respect to a baseline procedure being performed by a skilled practitioner, the processor is configured to provide feedback based on the following three factors: (1) the time required to negotiate the esophagus with the tool; (2) the time required to locate the tumor once the tool was advanced into the stomach; and, (3) whether the tumor was successfully located. Such feedback can be provided to the student during the exercise, or kept hidden from the student until the exercise is complete, or can be sent to a proctor for grading the student's performance. Based on the above-noted three factors, a proctor may determine that the student's performance with respect to all three factors must be acceptable in order to achieve a passing grade for the exercise, or the proctor may determine that a passing grade will be achieved as long as the tumor is located, and that the timing data will simply be provided to the student as feedback, rather than be used to determine if the student passed or failed the exercise. Those of ordinary skill in the art will recognize that sensor data can be used in many different ways to evaluate a student's performance.

In a simple form, contact-less sensors in accord with the present invention can be configured to provide feedback to a student during a simulated procedure. The data from the contact-less sensors can be utilized in a variety of different ways. For example, the data can be used to provide relatively simple feedback, such as turning lights on or off, and/or activating aural or verbal prompts or cues. The data from the contact-less sensors can also be manipulated and analyzed by a more complex processing system, such as a computer. The use of a computer enables data collected during a training exercise to be immediately processed and displayed, immediately processed but stored for later use, stored for later processing, compared to similar data, electronically distributed to other users in a network, or any combination thereof. Where a student has previously performed the simulated procedure, the evaluation can include a comparison of the student's past performance in carrying out the procedure with the student's current performance. Thus, even if the student fails to achieve a passing score, the student may receive positive reinforcement of any improvement, based on a comparison with earlier attempts.

The concept of saving an old score and comparing the old score with a current score can be extended to include a comparison of a current score with the scores of other trainees. For example, a medical school may collect data for students in each year of medical school who perform the same simulated procedure. Those scores can be averaged to determine a standardized score for first year students, a standardized score for second year students, and so on. Trainees can then compare their scores with such standardized scores, to evaluate their progress. The scores of other students can be further separated by class rank, so that trainees can evaluate their performance based on class rankings to see if their score is consistent with a higher class ranking or a lower class ranking. Scores can also be collected nationally, so that trainees can evaluate their progress compared to a national average learning curve or other national statistics.

One score-based metric that is likely to be very useful is a measurement of a rate at which skills are learned. Learning institutions that wish to increase the efficiency of their programs need to collect data relating to different teaching strategies, in order to compare the different strategies and identify those strategies that consistently result in higher evaluation scores. Simulators including contact-less sensors can be used to evaluate the performance of students undergoing different training curriculums, and the results obtained can be compared to identify the curriculum that leads to students receiving higher scores.

FIG. 13 schematically illustrates another type of feedback that might be provided to a student using a trainer including contact-less sensors and corresponding detection objects in accord with the present invention. As shown in this Figure, a student is performing a training exercise using a system 120 including a trainer 124 and a display 122. Trainer 124 includes one or more contact-less sensors (or one or more detection objects). A processor 148 is coupled to the sensors (or detection objects, as described above) and is further coupled to display 122. As discussed in detail above, the processor is configured to provide feedback based on a signal received from at least one of the contact-less sensors and the corresponding detection objects. Trainer 124 is specifically configured to facilitate learning ultrasound techniques. Processor 148 is further logically coupled to a memory 150, and memory 150 includes a plurality of ultrasound images, such as ultrasound image 126. As a student manipulates a simulated ultrasound imaging probe 134, processor 148 will utilize the signals received from the contact-less sensors or the detection objects. As discussed in detail above, simulated ultrasound imaging probe 134 will include one of a detection object or a contact-less sensor, while trainer 124 includes the other of the detection object and the contact-less sensor. Significantly, simulated ultrasound imaging probe 134 can be implemented using only a single detection object/contact-less sensor 146 (although additional detection objects/contact-less sensors can be used), whereas trainer 124 will require a plurality of detection objects/contact-less sensors, because trainer 124 functions by determining the position of simulated ultrasound imaging probe 134 relative to trainer 124, as the simulated ultrasound imaging probe is moved over the surface of the trainer and the student views ultrasound images of internal structures. As long as the position of simulated ultrasound imaging probe 134 can be accurately determined relative to trainer 124, trainer 124 need not include any internal structures, and actual ultrasound images of corresponding internal structures of real patients can instead be used. That is, if the simulated ultrasound imaging probe is positioned relative to the simulated torso so that an ultrasound image of the kidney would be obtained if the simulated torso were an actual patient, then the ultrasound image of a kidney of an actual patient (previously obtained) will be displayed to the student.

As shown in FIG. 13, trainer 124 comprises a simulated torso, including simulated kidneys 132. The simulated kidneys are disposed in anatomically correct positions relative to the simulated torso. Kidneys 132 are indicated by dash lines because the kidneys will be hidden from view by a layer of simulated tissue 130. The exact size and shape of simulated tissue 130 is not significant, so long as the simulated tissue covers kidneys 132. Preferably, the size and shape of trainer 124 are substantially proportional to those of a fully-grown average male torso. However, in another embodiment, trainer 124 is alternatively formed according to the size and the proportions of a fully-grown average female. In addition, in yet another embodiment, the trainer has the size and the proportions of a small child or infant. Trainer 124 rests on a base 125, which is preferably contoured to accommodate the trainer's dimensions. In addition, trainer 124 is buttressed by underlying structures, giving realistic shape and appearance to the trainer as though a complete muscular and skeletal system supports an exterior body cover 123. A lower boundary 127 of the trainer is roughly commensurate with the lower abdomen of an actual male. Parts of the hypogastric and iliac areas have been included, but the lower extremities have been omitted. From the lower abdomen, the trainer continues to follow the outline of an average-sized male torso. Lumbar and hypochondriac, medial and lateral areas, as well as umbilical and epigastric areas, are faithfully replicated. Trainer 124 extends through the upper chest, which includes the upper neck portion. Upper extremities have been omitted.

Preferably, simulated ultrasound imaging probe 134 will have a size, shape, and weight corresponding to an actual commercially available ultrasound imaging probe. If simulated ultrasound imaging probe 134 includes a sensor (and trainer 124 includes a plurality of detection objects), then the sensor in simulated ultrasound imaging probe 134 will be logically coupled to processor 148. If simulated ultrasound imaging probe 134 includes a detection object (and trainer 124 includes a plurality of sensors), then the plurality of sensors implemented in trainer 124 will be logically coupled to processor 148. To enhance a resolution (i.e., to enhance the ability of trainer 124/processor 148 to accurately determine the physical position of simulated ultrasound imaging probe 134 relative to trainer 124), it may be useful to include an additional detection object/sensor in simulated ultrasound imaging probe 134, at a position spaced apart from the first detection object/sensor in simulated ultrasound imaging probe 134.

Regardless of whether detection objects or sensors are implemented in trainer 124 (the other of the detection objects and sensors being implemented in simulated ultrasound imaging probe 134), the detection objects, the contact-less sensors, and the processor are configured to be able to determine a position of simulated ultrasound imaging probe 134 relative to simulated tissue 130 (and simulated kidneys 132). Thus, processor 148 can use an appropriate ultrasound image to display to the student. As the student moves simulated ultrasound imaging probe 134 relative to simulated kidneys 132, a different ultrasound image will be displayed to the student.

The kidney displayed in ultrasound image 126 includes abnormal tissue 128. Preferably, ultrasound image 126 will be an actual ultrasound image of the kidney that includes actual abnormal tissue. However, ultrasound image 126 can also be implemented by taking an actual ultrasound image of a healthy kidney and modifying the image to include a simulated portion of abnormal tissue. Depending on the training scenario being implemented using trainer 124, each ultrasound image displayed to the student can be an ultrasound image of a healthy kidney, an ultrasound image of a diseased kidney, or combinations of ultrasound images of healthy kidneys and diseased kidneys (for example, the right simulated kidney could simulate a healthy kidney, and the left simulated kidney could simulate a diseased kidney). It should be understood that trainer 124 can include additional organs, or different organs, so that ultrasound images of other organs are displayed to the student based on the position of simulated ultrasound imaging probe 134 relative to trainer 124. Thus, an ultrasound trainer in accord with the present invention including a simulated kidney is intended to be exemplary, rather than limiting on the scope of the present invention.

In at least one embodiment, trainer 124 includes a sensor field of Hall Effect or similar sensors incorporated into (or disposed beneath) simulated tissue 130, such that the sensor field is hidden from the user's view. Each sensor in the sensor field is logically coupled to processor 148, so that each sensor sends a signal to the processor when sensing the detection object (a magnet when the sensor field comprises magnetic sensors) incorporated into simulated ultrasound imaging probe 134. The processor is configured to process signals received from the sensor field, to determine the position of simulated ultrasound imaging probe 134 relative to the sensor field incorporated into trainer 124. Based on the position of simulated ultrasound imaging probe 134, the processor is further configured to select an appropriate ultrasound image from memory 150. As the position of simulated ultrasound imaging probe 134 changes relative to trainer 124 (i.e., as the student manipulates simulated ultrasound imaging probe 134), the processor will receive updated sensor data from the sensor field, and a new ultrasound image may be selected, as appropriate.

Simulated tissue 130 will include a plurality of individually identifiable detection objects or contact-less sensors (generally consistent with the principles discussed above in detail) such that the position of simulated ultrasound imaging probe 134 relative to simulated tissue 130 can be determined with a relatively high resolution. This high resolution of the position will enable processor 148 to determine an appropriate ultrasound image to display to the student, based on the position of the simulated ultrasound imaging probe relative to the trainer. The greater the resolution provided, the more sensitive the training system will be to movements of the ultrasound imaging probe, and the more realistic the training simulation will be.

Simulated tissue 130 is preferably implemented as a plurality of different layers. In some embodiments of the invention, simulated tissue 130 is incisable, such that a student can use a scalpel or other surgical instrument to penetrate to the simulated tissue, to gain access to simulated kidneys 132. Alternates to the preferred embodiment may have more or fewer layers, to simulate the different anatomical features for a given area of the human body.

Where an incisable simulated tissue is employed, trainer 124 can be used for both ultrasound training and surgical training. It should be understood that the use of an incisable tissue to facilitate surgical training is optional and not required. In embodiments including incisable tissue, the trainer has swatches of simulated human tissue structure draped over practice surgery areas and over areas of body cover 123, and these swatches are preferably fastened to trainer 124 with hook and loop fasteners or snap fasteners (not shown). The incisable simulated tissue is intended to be replaced after its useful life is expended. Only the practice surgical swatches need be replaced instead of the entirety of body cover 123. Because body cover 123 is not intended to be incised, body cover 123 can be coupled to a rigid plastic base. Preferably, the practice surgery areas include the abdomen, the chest, and the neck areas. Each of the practice areas may include further simulated anatomical features and more tissue structure, as described below.

If trainer 124 is not intended for surgical training as well as ultrasound training, a simpler simulated human tissue (including only a skin layer and a detection object/sensor layer) can be employed, as discussed below. Simulated human tissue 130 preferably includes a number of layers of elastomeric compositions selected and configured to replicate the actual layered membranes and sub-membranes of a human body. The layers may be of similar formulation or they may be of different formulations, depending on the human tissue being simulated. For instance, simulated fat is of a different consistency than simulated muscle. As used herein, a stratum, or layer is used to denote a substantially uniform area extending generally parallel to the outer surface. Layers in the human tissue structure may be bonded to one another, or they may be individual layers that are placed atop one another without being bonded. Layers may even be separated by members that are not a part of the human tissue structure. Further, for any given surgical area, the layers of simulated tissue 130 can vary in thickness.

Beginning with the uppermost and outermost layer, a composite skin layer 136 simulates human skin. For the purposes of this description, skin is considered a membranous layer. Composite skin layer 136 includes an elastomeric layer 136*a* and a fibrous layer 136*b*. Elastomeric layer 136*a* is preferably implemented using a silicone blend, which can be pigmented to generally achieve a flesh tone. As is known in the elastomeric arts, any of a number of suitable pigments for coloring silicone blends can be used to visually represent different layers. The silicone used in the invention is preferably obtained from Silicones, Inc. of High Point, N.C., and is sold under the trademark XP-153A™. Preferably, the silicone is mixed with a thinning agent, also obtained from Silicones, Inc., and sold under the trademark GI THINNER™. The volume ratio of silicone to thinner may be adjusted to achieve a suitable hardness and texture, but preferably, the volume ratio is between about 2:1 and about 10:1 of silicone to thinner. Techniques for molding and curing items of silicone and thinner are known by those of ordinary skill in the art and need not be set forth herein to enable the present invention. Although silicone has been found to perform best, other elastomeric materials, such as latex, may alternatively be used.

It should be noted that attaching a fibrous layer to a silicone-based simulated skin layer requires care. In general, it is difficult to get a non-silicone material to bond to a silicone material. One method of coupling a fibrous layer to a silicone-based simulated skin layer involves coating the fibrous substrate with a silicone material. Such a silicone-coated fibrous layer substrate can be coupled to a silicone-based skin layer using a silicone compatible (preferably a silicone-based) adhesive. The fibrous layer is used because composite layer 136 represents a membranous layer. Thus, a reinforcing layer is combined with the elastomeric layer to enhance the realism of the skin layer.

For the purposes of this description, human tissue, not including bone or cartilage, may be divided into two classes. The first class is tissue whose presence in a human body fills or lends significant bulk. The second class is tissue whose function is to line, support, or surround the first class of tissue. As used herein, the second class of tissue is thus referred to as a "membrane" or "membranes," or as "membranous tissue." By implication, the first class is referred to as "sub-membranous tissue." Membranes are generally thinner, but are characterized in that they are comparatively more dense and tougher (to dissect) than sub-membranous tissue, due in part to their composite construction, since they typically include a fibrous layer. The types of membranes found in a human body include skin, serous membranes (such as the peritoneum, pericardium, or parietal pleura), and any of a number of fasciae or connective tissues, such as the deep fascia, which binds muscles (including the anterior and posterior rectus sheath or aponeuroses, ligaments, and tendons). By comparison, sub-membranous tissue, such as fat, muscle, or extraperitoneal tissue, occupies more space and is generally easier to dissect than membranes. However, even in the different tissues that are sub-membranous, there can be a great disparity in tissue consistency. For instance, fat is much easier to dissect and has a very different tactile characteristic than muscle. In some instances, the blunt end of a scalpel can be employed to readily dissect fat. Given the need to provide realistic simulation and training models, it is therefore appropriate to impart a level of realism to surgical trainers that enables a user to experience the subtle differences between membranous and sub-membranous tissues, as well as to experience the tactile and visual characteristics of various types of each.

The substrate used in fibrous layer 136b imparts a realistic resistance to cutting, similar to the resistance of real human skin. The substrate is preferably made of a nylon mesh material. However, other fabrics that perform equally well can alternatively be used. Any number of synthetic and natural fabrics are effective for use in this layer. While composite skin layer 136 is intended to be a very close approximation to actual human skin, it is to be recognized that real human skin includes numerous strata of virtually imperceptible differences. However, composite skin layer 136 of the present invention closely represents the epidermis and dermis of actual human skin. Preferably, a pigment is added in the silicone blend to color the skin similar to human skin so that as the skin layer is dissected, the color of the elastomeric material is suggestive of human tissue. Composite skin layer 136 is preferably about 2 millimeters to about 4 millimeters thick. While a preferred embodiment of composite skin layer 136 includes a single reinforcing fibrous layer 136b, other embodiments can utilize additional reinforcing layers.

Sensor layer 140 of simulated tissue 130 is the layer including the network of detection objects/sensors (i.e., the sensor field discussed above). As noted above, the more detection objects/sensors included in sensor layer 140, the more responsive the training system will be to movements of the simulated ultrasound imaging probe. Relatively few detection objects/sensors would mean that a student would need to move the simulated ultrasound imaging probe a greater distance in order for processor 148 to display an additional ultrasound image to the student, compared to a sensor layer 140 that includes a greater number of detection objects/sensors. Suitable technology for implementing detection objects/sensors has been discussed in detail above.

Underlying composite skin layer 136 and sensor layer 140 is a layer 142 that simulates the subcutaneous fat found in actual human tissue. For purposes of this description, subcutaneous fat is considered a sub-membranous layer. Subcutaneous fat layer 142 is preferably formed of a silicone blend and includes a pigment. However, to simulate the less dense texture of fat, the formulation is adjusted to be different than that used for the layer simulating skin. The volume ratios used for the fat layer are preferably in the range from about 1:1 to about 2:1, silicone to thinner. Subcutaneous fat layer 142 is similar in texture and hardness (tactile sensation) to a layer of subcutaneous fat found in humans. In humans, the subcutaneous fat occurs as a thin layer of loose fatty tissue underlying the skin and binding it to underlying layers. It is optional to provide a fibrous material or fibrous layer in the subcutaneous fat and to add pigments. Preferably, subcutaneous fat layer 142 is from about 10 to about 60 mm thick. It will be appreciated, therefore, that the relative thicknesses of layers in simulated human tissue 130 are not drawn to scale.

Underlying subcutaneous fat layer 142 is a composite layer representing an anterior rectus sheath layer 144. For purposes of this description, the anterior rectus sheath is considered a membranous layer. The anterior rectus sheath layer includes an elastomeric layer 144a (preferably a silicone blend) and a reinforcing silicone-coated fibrous layer 144b. Preferably, the fibrous material is a nylon mesh; however, SPANDEX™ material has also been found to perform well for this layer. Fibrous layer 144b is pre-formed and bonded to elastomeric layer 144a using the method described above. Elastomeric layer 144a can instead be provided as a non-bonded layer. The formulation of silicone and thinner used to form anterior rectus sheath layer 144 is preferably in the range from about 1:0 to about 2:1, silicone to thinner. Silicone alone (with no thinner) may be used for this layer because the rectus sheath is a dense, tough serous layer, and these characteristics can be achieved by using little or none of the thinner.

Preferably, the silicone used for elastomeric layer 144a is of a different consistency than that used for composite skin layer 136 or subcutaneous fat layer 142. The silicone preferably used for producing anterior rectus sheath layer 144 is obtained from Silicones, Inc. under the trademark GI-1000A™. This formulation of silicone is of a higher specific gravity, and therefore, upon curing, will be denser than composite skin layer 136 or subcutaneous fat layer 142. For the sake of comparison, the lighter silicone, XP-153A™, has a specific gravity of about 0.98, while the more dense silicone, GI-1000A™, has a specific gravity of about 0.99. Preferably, anterior rectus sheath layer 144 is from about 0.5 to about 1.5 mm thick, and more preferably, about 1.0 mm thick. While a preferred embodiment of anterior rectus sheath layer 144 includes a single reinforcing silicone-coated fibrous layer 144b, additional reinforcing layers can be used. If desired, simulated tissue 130 can include additional underlying layers, such as a muscle layer and additional membranous layers (neither shown).

Note that the relatively complicated simulated tissue 130 is intended to provide a realistic training experience when a student physically manipulates the simulated tissue, such as in a simulated procedure where the student is required to perform an incision and remove a simulated kidney. In embodiments where simulated tissue 130 will be incised, the simulated tissue is a consumable item that is intended to be readily replaced.

In other aspects of the present invention, simulated tissue 130 simply prevents the contact-less sensors/detection objects associated with the skin layer from being visible to the student. In such an embodiment, simulated tissue 130 can be implemented using a single elastomeric layer and a sensor/detection object layer. While FIG. 13 indicates that simulated kidneys 132 are actually disposed beneath the simulated tissue 130, it should be understood that particularly in embodiments where physical access to the simulated kidneys is not required, the simulated kidneys can be omitted altogether (since it is the detection/sensor layer that is responding to the position of the simulated ultrasound imaging probe, not the simulated kidneys themselves). Thus, unless access to the simulated kidneys is part of training scenarios to be implemented using trainer 124, the simulated kidneys can be omitted, so long as processor 148 is programmed to recognize the individual sensors/detection elements in sensor layer 140 that correspond to a hypothetical position for the simulated kidneys.

Such an ultrasound trainer will enable students to gain familiarity with obtaining and reading ultrasound images, and to learn how the manipulation of ultrasound imaging probe relative to a patient will result in the collection of different types of ultrasound images. In early training stages, a student may simply be instructed to obtain an ultrasound image of the kidney. Trainer 124 will enable a student to practice positioning an ultrasound imaging probe relative to a patient (i.e., relative to the torso portion of trainer 124) until the simulated ultrasound imaging probe is properly disposed to obtain an ultrasound image of the kidney. The student can perform this training exercise without requiring an actual patient to be present, and if the ultrasound images have been previously generated by ultrasound imaging of real patients, the student will be able to gain familiarity with actual ultrasound images. In this basic training scenario, it is likely that the ultrasound images (stored in memory 150) of the kidney selected by the processor for display will correspond to healthy kidneys. In more advanced training scenarios, ultrasound images from a patient having a disease condition relating to the kidneys can be obtained, and stored in memory 150. A training exercise can be constructed using such images in which a student's ability to recognize the disease condition is tested. Significantly, the basic training exercise and the more advanced training exercise are performed on the same trainer. The only change that needs to be made is to instruct processor 148 to display ultrasound images of normal kidneys, or ultrasound images from diseased kidneys. All of those images can be stored in memory 150. At the beginning of the training exercise, a menu may be displayed to the student such that the student can select an advanced or basic training exercise, and so that the images selected by the processor in response to the student's manipulation of the simulated ultrasound probe will correspond to either the advanced training scenario (the presence of a disease condition in the kidneys) or the basic training scenario. Significantly, in ultrasound training exercises involving live patients, a patient having a kidney disease condition must be available in order for a student to obtain familiarity with visualizing disease conditions in ultrasound image during a training exercise. Using the present invention, a student can practice visualizing both healthy kidneys and diseased kidneys using the same trainer, without the need for any live patient to be available.

With respect to potential disease conditions of the kidney, cancer of the kidney is one of the more common kidney disease conditions. Renal cell carcinoma is the most common type of kidney cancer, accounting for more than 90% of malignant kidney tumors. Although renal cell carcinoma usually grows as a single mass within the kidney, a kidney may contain more than one tumor. Memory 150 can store ultrasound images from several different patients having diseased kidneys, thereby enabling trainer 124 to display a wide variety of different tumor sizes and locations. In actual patients, a disease condition can affect both kidneys at the same time. In a training exercise implemented using trainer 124, processor 148 can be configured to simulate a patient having a disease condition present in only one kidney, or in both kidneys.

The present invention can be implemented as a system that collects data using contact-less sensors that are incorporated into a simulated physiological structure (or a simulated tool used to manipulate the simulated physiological structure, or a sensor bed, as discussed in detail above), stores the collected data in a digital format, processes and evaluates the data, and compares the data to related data. The benefits of the present invention will thus be readily apparent from the discussion presented above.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A medical training simulator suitable for training and testing personnel, comprising:
   (a) a contact-less sensor;
   (b) a detection object adapted to trigger the contact-less sensor;
   (c) a simulated physiological structure configured to visually and tactilely resemble an anatomical structure; and
   (d) a sensor bed configured to physically support the simulated physiological structure, the detection object being incorporated into one of the sensor bed and the simulated physiological structure, and the contact-less sensor being incorporated into the other of the sensor bed and the simulated physiological structure, such that the one of the detection object and the contact-less sensor incorporated into the simulated physiological structure is embedded within the simulated physiological structure, and the other of the detection object and the contact-less sensor incorporated into the sensor bed is disposed below a surface of the sensor bed that supports the simulated physiological structure, so that when the simulated physiological structure is properly positioned relative to the sensor bed, the one of the detection object and the contact-less sensor incorporated into the sensor bed is disposed beneath the other of the contact-less sensor and the detection object incorporated into simulated physiological structure, such that the contact-less sensor and the corresponding detection object:

(i) share a common axis; and
(ii) are adjacent to one another, such that the contact-less sensor is triggered by the detection object.

2. The physiological training and evaluation simulator of claim 1, wherein the detection object is incorporated into the simulated physiological structure, and the contact-less sensor is incorporated into the sensor bed.

3. The physiological training and evaluation simulator of claim 1, wherein the detection object comprises a radiofrequency identification (RFID) tag, and the at least one contact-less sensor comprises an RFID tag reader, and the RFID tag reader must be immediately adjacent to the RFID tag in order for the RFID tag to trigger the RFID tag reader.

4. The physiological training and evaluation simulator of claim 1, wherein the sensor bed is incorporated into a base of a box trainer, and the simulated physiological structure is disposed within a working volume in the box trainer.

5. The physiological training and evaluation simulator of claim 1, wherein the at least one contact-less sensor comprises at least one sensor selected from the group consisting of an inductive sensor, an eddy-current sensor, a capacitance sensor, and an impedance sensor.

6. A method for evaluating a performance of a simulated medical procedure, comprising the steps of:
(a) performing the simulated medical procedure, wherein proper performance of the simulated medical procedure requires moving a tool including a plurality of contact-less sensors relative to a first portion of a training model, a second portion of a training model, and a third portion of the training model, the tool generating a signal only when the tool is proximate a predefined portion of the training model related to the simulated medical procedure, each such predefined portion being designated with a detection object, the tool generating a first signal uniquely identifying the first portion of the training model when a first detection object is sensed by a first sensor as the tool is proximate the first portion of the training model, generating a second signal uniquely identifying the second portion of the training model when a second detection object is sensed by a second sensor as the tool is proximate the second portion of the training model, and generating the first and second signals uniquely identifying the third portion of the training model when a third detection object is sensed by the first sensor as the tool is proximate the third detection object and a fourth detection object is sensed by the second sensor as the tool is proximate the fourth detection object, wherein the first and second signals are not identical, the first signal only being generated when the tool is proximate the first or third detection objects, and the second signal only being generated when the tool is proximate the second or fourth detection objects;
(b) collecting sensor data during the performance of the simulated medical procedure, wherein the sensor data are collected without requiring physical contact between the tool and any of the first, second, third, and fourth detection objects; and
(c) using the sensor data to evaluate the performance of the simulated medical procedure, including the steps of:
(i) determining if the tool was proximate the first portion of the model during an appropriate portion of the simulated medical procedure as indicated by the first signal then being included in the sensor data;
(ii) determining if the tool was proximate the second portion of the model during an appropriate portion of the simulated medical procedure as indicated by the second signal then being included in the sensor data; and
(iii) determining if the tool was proximate the third portion of the model during an appropriate portion of the simulated medical procedure as indicated by the first signal and the second signal then being included in a segment of the sensor data that indicates the tool is proximate the third portion of the model.

7. A physiological training and evaluation simulator suitable for training and testing personnel, comprising:
(a) a simulated physiological structure comprising at least one contact-less sensor configured to detect a change in an ambient electric field adjacent to each contact-less sensor, the portion of the simulated physiological structure proximate the at least one contact-less sensor being configured to tactilely and visually resemble a real anatomical structure, and to hide the at least one contact-less sensor from view, wherein the at least one contact-less sensor comprises a capacitor, a first plate of the capacitor extending along a lumen in the simulated physiological structure and a second plate of the capacitor extending along an opposite side of the lumen, such that when the tool is advanced through the lumen, the tool changes a baseline charge of the capacitor, thereby providing an indication that the tool has been advanced to a position within the lumen; and
(b) a tool to be used during the training simulation, the tool being configured to change the ambient electric field adjacent to each contact-less sensor when the tool is proximate that contact-less sensor, without requiring the tool to:
(i) emit a magnetic field that is detected by the contact-less sensor; or
(ii) emit an electromagnetic field that is detected by the contact-less sensor; or
(iii) be in physical contact with the contact-less sensor.

8. A physiological training and evaluation simulator suitable for training and testing personnel, comprising:
(a) a simulated physiological structure comprising a first detection object and a second detection object, said first and second detection objects comprising magnets exhibiting measurably different magnetic fields; and
(b) a tool to be used during a training simulation, the tool comprising a first sensor configured to detect the first detection object during the training simulation, without detecting the second detection object, and a second sensor configured to detect at least the second detection object during the training simulation, the first and second sensors comprising first and second switches that change from a first state to a second state based on an intensity of a magnetic field to which each switch is exposed.

9. The simulator of claim 8, wherein the first and second detection objects are disposed proximate each other, thereby enabling a specific portion of the simulated physiological structure to be identified by detection of the first and second detection objects at substantially the same time during the simulation.

10. A physiological training and evaluation simulator suitable for training and testing personnel, comprising:
(a) a simulated physiological structure having:
(i) a first portion that includes a first permanent magnet exhibiting a magnetic field of a first intensity;

(ii) a second portion that includes a second permanent magnet exhibiting a magnetic field of a second intensity, the second intensity being larger than the first intensity; and
(iii) a third portion that includes a third permanent magnet and a fourth permanent magnet that are spaced apart such that their respective magnetic fields generally do not overlap, the third permanent magnet exhibiting a magnetic field of the first intensity, and the fourth permanent magnet exhibiting a magnetic field of the second intensity; and (b) a tool to be used during a training simulation, the tool being configured to generate a signal uniquely identifying which one of the three portions the tool is proximate to during the simulation, the tool comprising:
(i) a first switch that is in a first state when exposed to a magnetic field less than the first intensity and changes to a second state when exposed to a magnetic field that is equal to or greater than the first intensity; and
(ii) a second switch that is in a first state when exposed to a magnetic field less than the second intensity and changes to a second state when exposed to a magnetic field that is equal to or larger than the second intensity, such that:
(A) when the tool is proximate the first portion of the simulated physiological structure, the first switch is in the second state and the second switch is in the first state;
(B) when the tool is proximate the second portion of the simulated physiological structure, the first switch is in the second state and the second switch is in the second state;
(C) when the tool is proximate the third portion of the simulated physiological structure and the third permanent magnet, the first switch is in the second state and the second switch is in the first state; and
(D) when the tool is proximate the third portion of the simulated physiological structure and the fourth permanent magnet, the first switch is in the second state and the second switch is in the second state.

* * * * *